TODO

(12) United States Patent
Xu et al.

(10) Patent No.: US 11,595,207 B2
(45) Date of Patent: Feb. 28, 2023

(54) UTILIZING ENCRYPTION KEY EXCHANGE AND ROTATION TO SHARE PASSWORDS VIA A SHARED FOLDER

(71) Applicant: Dropbox, Inc., San Francisco, CA (US)

(72) Inventors: Jiayi Xu, Redmond, WA (US); Brent Heeringa, Williamstown, MA (US); Andrew Hannon, Leeds, MA (US); Katherine Prior, Mercer Island, WA (US)

(73) Assignee: Dropbox, Inc., San Francisco, CA (US)

( * ) Notice: Subject to any disclaimer, the term of this patent is extended or adjusted under 35 U.S.C. 154(b) by 142 days.

(21) Appl. No.: 17/132,288

(22) Filed: Dec. 23, 2020

(65) Prior Publication Data
US 2022/0200800 A1 Jun. 23, 2022

(51) Int. Cl.
*H04L 9/08* (2006.01)
*G06F 21/62* (2013.01)

(52) U.S. Cl.
CPC ........ *H04L 9/0891* (2013.01); *G06F 21/6227* (2013.01); *H04L 9/0825* (2013.01); *H04L 9/0894* (2013.01)

(58) Field of Classification Search
CPC ... H04L 9/0891; H04L 9/0825; H04L 9/0894; G06F 21/6227
USPC ....................................................... 380/282
See application file for complete search history.

(56) References Cited

U.S. PATENT DOCUMENTS

| 7,406,596 B2* | 7/2008 | Tararukhina ........ H04L 63/0435 |
| | | 713/165 |
| 8,572,757 B1 | 10/2013 | Stamos et al. |
| 8,625,805 B1 | 1/2014 | Statica et al. |
| 8,707,390 B2* | 4/2014 | Van De Groenendaal .................. |
| | | H04W 12/04 |
| | | 713/157 |

(Continued)

FOREIGN PATENT DOCUMENTS

| AU | 2018100271 A4 | 4/2018 |
| EP | 1083699 A1 | 3/2001 |
| KR | 101044455 B1 | 6/2011 |

OTHER PUBLICATIONS

"SecureDoc v5 introduced by WinMagic," M2 Presswire, retrieved from https://search.proquest.com/docview/822530411, Jan. 6, 2011, 2 pages.

(Continued)

*Primary Examiner* — Bryan F Wright
(74) *Attorney, Agent, or Firm* — Keller Preece PLLC

(57) ABSTRACT

This disclosure describes methods, non-transitory computer readable storage media, and systems that provide secure password sharing across a plurality of users and client devices via a shared folder. For example, in one or more embodiments, the disclosed system retrieves a public key set including public encryption keys for client devices having access to the shared folder. The disclosed system provides the public key set to a client device requesting to share the shared folder. The disclosed system receives an encrypted payload for the shared folder and a shared encryption key that is utilized to encrypt the payload and is encrypted in the shared folder utilizing the public key set. The disclosed system also detects key rotation events and notifies one or more client devices to generate a modified shared encryption (Continued)

key and re-encrypt the payload for storage within the shared folder.

20 Claims, 12 Drawing Sheets

(56) References Cited

U.S. PATENT DOCUMENTS

| | | | |
|---|---|---|---|
| 8,732,462 B2 | 5/2014 | Bhathena et al. | |
| 9,053,341 B2 | 6/2015 | Odnovorov et al. | |
| 9,053,342 B2 | 6/2015 | Odnovorov et al. | |
| 9,088,557 B2 | 7/2015 | Aoyagi et al. | |
| 9,641,488 B2 | 5/2017 | Mityagin et al. | |
| 9,654,288 B1 | 5/2017 | Howell et al. | |
| 9,742,570 B2 | 8/2017 | Grajek et al. | |
| 9,773,119 B2 * | 9/2017 | Sinha | H04L 63/083 |
| 9,904,629 B2 | 2/2018 | Ford et al. | |
| 10,158,683 B2 | 12/2018 | Yuki et al. | |
| 10,805,071 B2 | 10/2020 | Wold et al. | |
| 11,323,477 B1 * | 5/2022 | Kumar | H04L 63/168 |
| 2006/0174003 A1 * | 8/2006 | Wilson | H04L 63/083 709/225 |
| 2013/0254536 A1 * | 9/2013 | Glover | G06F 21/6209 713/165 |
| 2013/0311769 A1 | 11/2013 | Hayes | |
| 2015/0347782 A1 * | 12/2015 | Sturonas | G06F 21/64 713/165 |
| 2016/0065548 A1 * | 3/2016 | Brouwer | H04L 9/12 713/171 |
| 2018/0150477 A1 * | 5/2018 | Jewell | G06F 16/1734 |
| 2019/0097835 A1 * | 3/2019 | Bhat | G06Q 10/06 |
| 2020/0162440 A1 * | 5/2020 | Howell | H04L 9/0869 |
| 2020/0381088 A1 * | 12/2020 | Kim | G06Q 50/265 |

OTHER PUBLICATIONS

International Search Report and Written Opinion for PCT Application No. PCT/US2021/047829 dated Nov. 23, 2021, 15 pages.

* cited by examiner

UTILIZING ENCRYPTION KEY EXCHANGE AND ROTATION TO SHARE PASSWORDS VIA A SHARED FOLDER

BACKGROUND

Technological advances in network communications and computing device capabilities have increased access to many different types of services over network connections. For example, many online systems provide remote access to services via login interfaces that allow users to log in to their accounts with the systems. Accordingly, such online systems allow a user to create a separate user account with login information (e.g., a username and a password) for each of the different services. Because users often have large numbers of different accounts for many different services, each having its own login information, users can find it difficult to remember and securely manage login information for each of the different services.

Many conventional credential storage systems provide storage of login information for different accounts. For example, some conventional systems store credentials on a local client device or on a remote device (e.g., cloud storage) that allows a user to access their login information for logging in to accounts for various services from a central location. In particular, some conventional credential storage systems store and encrypt passwords to various services behind a central credential (e.g., a username/password combination or biometric credential). Alternatively, other conventional credential storage systems encrypt passwords using public encryption keys and distribute those public encryption keys to client devices that can use corresponding private encryption keys to decrypt the passwords.

While these conventional credential storage systems provide a central location of digitally storing login information for users, the conventional systems exhibit a number of disadvantages. Specifically, by utilizing a single set of credentials (e.g., associated with a single user) to access login information for different services, the conventional systems limit access to only users that also have access to the credentials. Thus, if a first user of the conventional systems desires to give access to any of the login information to a second user, the first user must provide the credentials to the second user. Providing the credentials to the second user also gives access to all of the login information stored in the account rather than a selective sharing of login information. Accordingly, the conventional credential storage systems lack flexibility and security for extending use beyond a single user.

In addition to rigid login-information-access protocols, a credential storage system that shares digital data among users and client devices introduces network security risks and data-loss risks. For instance, after users leave a sharing group that shares secure data among users, the former members of the sharing group pose a security risk and should no longer have access to the secure data. For instance, when a user associated with a computing device with a private encryption key leaves a sharing group, the leaving user may continue to access the secure data until a computing device updates the collection of public encryption keys corresponding to authorized members of the sharing group. Additionally, when encrypting or re-encrypting data across client devices, differences in the data encrypted and synchronized across the client devices results in data loss. For example, an asynchronous connection to a central location (e.g., a server) can cause a server or other computing device to lose data when client devices exchange or send different encryption key versions (e.g., in the case of key rotations) or different payloads stored at the client devices. Thus, any conventional credential storage (or other) system that shares data among client devices introduce both risks of compromised network security and data loss.

SUMMARY

This disclosure describes one or more embodiments of systems, methods, and non-transitory computer readable storage media that provide benefits and/or solve one or more of the foregoing and other problems in the art. For instance, the disclosed system encrypts a shared key within a payload for a shared folder and securely shares passwords from the shared folder across computing devices. To facilitate encrypting such passwords, the disclosed system retrieves public encryption keys for one or more client devices (e.g., each additional shared-folder member) having membership access to the shared folder in connection with providing access to the shared folder. The disclosed system also provides a public key set including the public encryption keys to an initial client device associated with an account of a content management system. Having received the public key set, the initial client device encrypts a payload (e.g., a set of passwords) for uploading to the shared folder utilizing a shared encryption key and then encrypts the shared encryption key utilizing the public key set. The disclosed system accordingly receives both the encrypted payload and the shared encryption key (which has been encrypted by the public key set) from the initial client device for storage within the shared folder.

In addition (or in the alternative) to encrypting such a payload, in some embodiments, the disclosed system securely rotates keys across computing devices based on a change in membership of a shared folder or some other key rotation event. In response to detecting a key rotation event, for instance, the disclosed system notifies client devices that have membership access to the shared folder of the key rotation event and updates a public key set. The disclosed system provides the updated public key set to each of the client devices with current access to (or membership in) the shared folder. After providing such an updated key set, the disclosed system receives, from an initiator client device, an updated encrypted payload and a modified (i.e., rotated) shared encryption key that has been encrypted utilizing the updated public key set. Accordingly, the disclosed system can automatically rotate a shared encryption key while preventing access to client devices that do not have membership access to the shared folder.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which.

DETAILED DESCRIPTION

Figure 1:
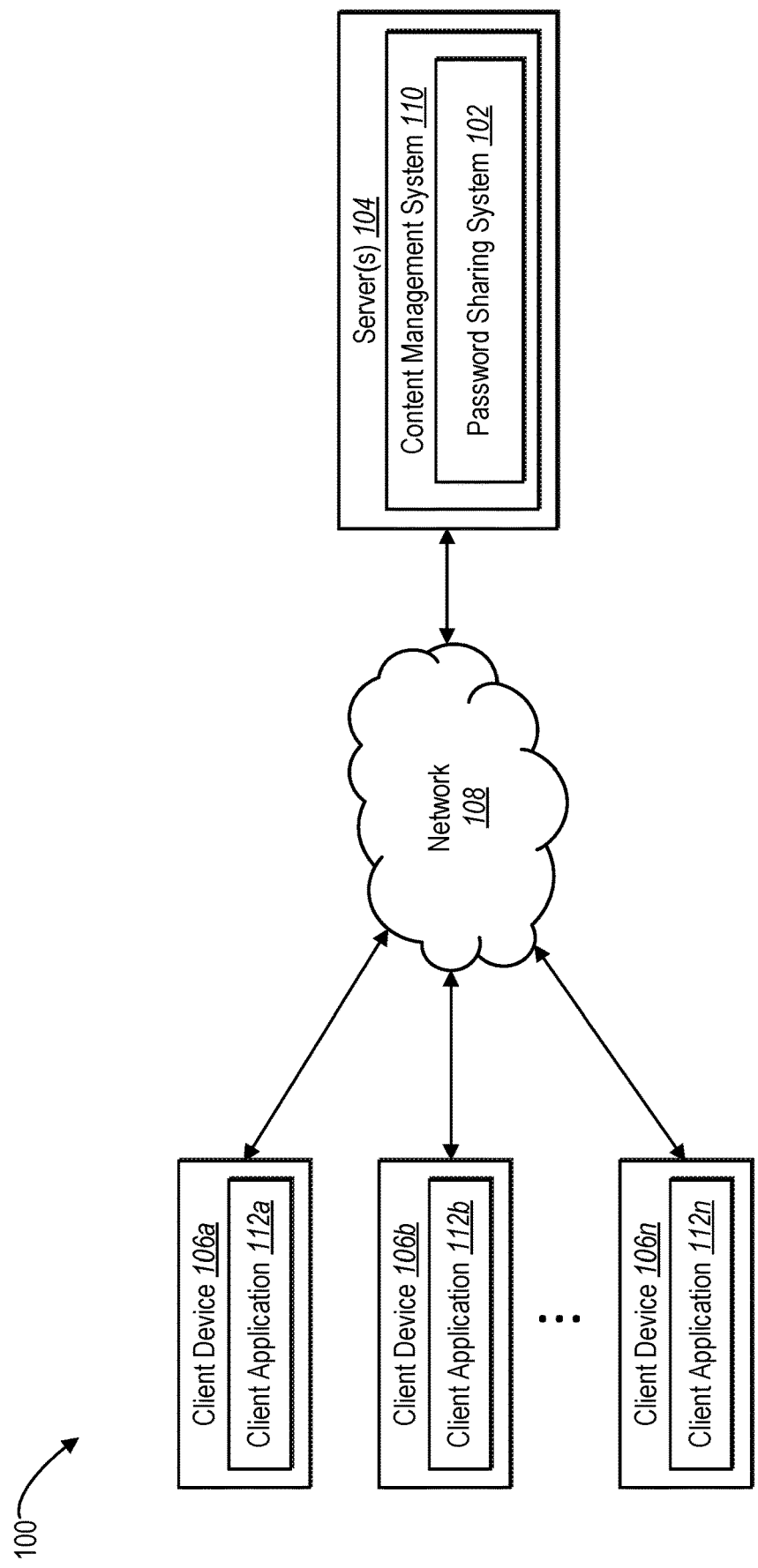
FIG. 1 illustrates a schematic diagram of an environment in which a password sharing system operates in accordance with one or more implementations.

This disclosure describes one or more embodiments of a password sharing system for encrypting a shared key in a payload and synchronizing shared passwords across client devices by one or both of a key exchange and a key rotation of the shared key and public encryption keys. For example, in some embodiments, the password sharing system determines that an initial client device initiates a request to share a shared folder with one or more client devices. The password sharing system retrieves public encryption keys from the client device(s) and then provides the public encryption keys to the initial client device. In some cases, the initial client device utilizes a shared encryption key to encrypt a payload for the shared folder (e.g., a set of passwords) and then utilizes the public encryption keys to encrypt the shared encryption key. The password sharing system further receives the encrypted payload and the shared encryption key (which has been encrypted utilizing the public key set) from the initial client device and stores the received encrypted payload and shared encryption key in the shared folder.

As mentioned, in some embodiments, the password sharing system generates a shared folder for sharing a set of passwords from an initial client device to one or more additional client devices. In response to a request from the initial client device to share the set of passwords, for instance, the password sharing system generates a shared folder for storing the set of passwords. In at least some embodiments, the password sharing system generates one or more subfolders within the shared folder for assigning different access permissions to one or more client devices with membership access to the shared folder.

When an initial client device sends a request to generate a shared folder for sharing a set of passwords, the password sharing system retrieves a public key set including public encryption keys from client devices. In particular, the password sharing system can obtain a public encryption key for each client device that will be granted membership access to the shared folder. In one or more embodiments, the password sharing system identifies public encryption keys previously received from the client devices when registering each client device with the password sharing system. The password sharing system also provides the public key set to the initial client device for the initial client device to use in encrypting a shared encryption key for delivering a payload from the initial client device to the password sharing system.

After providing a public key set to an initial client device in connection with a request to generate a shared folder, the password sharing system receives an encrypted payload and a shared encryption key from the initial client device. By utilizing the shared encryption key, the initial client device can encrypt a payload including a set of passwords for storage within the shared folder. In addition to encrypting the payload with the shared encryption key, the initial client device can encrypt the shared encryption key utilizing the public key set from the password sharing system. The password sharing system thus receives an encrypted version of the shared encryption key along with the encrypted payload from the initial client device and stores the payload with the encrypted version of the shared encryption key within the shared folder.

After the password sharing system has received an encrypted payload and a corresponding shared encryption key from an initial client device, in certain implementations, the password sharing system allows access to the contents of the shared folder to other client devices. In particular, in response to a request to access the content of the shared folder by another client device, the password sharing system can verify the requesting client device and provide the requesting client device with the encrypted payload and encrypted version of the shared encryption key. The requesting client device can decrypt the encrypted version of the shared encryption key (e.g., utilizing a private encryption key of the requesting device). Finally, the requesting client device can then decrypt the encrypted payload utilizing the shared encryption key and access the contents of the shared folder.

In addition (or in the alternative) to sharing passwords with requesting client devices, in some embodiments, the password sharing system rotates the shared encryption key for improved security. For instance, in response to detecting a key rotation event, the password sharing system notifies client devices of the event and retrieves an updated public key set from client devices having current membership access to the shared folder. The password sharing system can then provide the updated public key set to each of the client devices with current access or membership to the shared folder.

After the password sharing system detects a key rotation event and notifies a client device of the key rotation event, the client device rotates the shared encryption key by generating a modified (e.g., a new) shared encryption key. The client device further encrypts a payload comprising passwords with the modified shared encryption key and encrypts the modified shared encryption key with the updated public key set received from the password sharing system. Such an encrypted payload may include the same set of passwords or a new set of passwords. The password sharing system receives the updated encrypted payload and the modified shared encryption key from the client device and stores them in the shared folder. In some embodiments, the password sharing system also detects conflicts between client devices that attempt to upload updated shared folder data to the password sharing system by determining an initiator device and follower devices based on an order in which the data (e.g., payload) is received/committed. The password sharing system also disallows payload commits from client devices that are not the initiator device (e.g., based on a revision number associated with each received payload).

In addition to initializing or rotating a shared key for a shared folder, in some additional embodiments, the password sharing system provides advanced access control levels to a set of passwords via the shared folder. For example, the password sharing system can assign different access permissions to different client devices (and/or user accounts) based on a folder hierarchy within the shared folder. To illustrate, the password sharing system can allow different client devices to view, create, or modify one or more subsets of passwords by utilizing various access control levels for a client device relative to one or more subfolders within the shared folder.

The password sharing system described herein provides improvements to computing devices that implement credential storage. Specifically, the password sharing system improves security by utilizing key exchange or key rotation via public and shared encryption keys to share passwords across devices and user accounts. As suggested above, conventional credential storage systems can introduce network security risks by using a central credential (e.g., a username/password combination) to shield a series of encrypted credentials that—when used by unauthorized users or devices—can grant access to various online services. In contrast to a single and conventional credential as a shield, the password sharing system introduces multiple layers of encryption that improves password-protecting security by encrypting a payload for a shared folder that comprises both the passwords and a shared encryption key.

To facilitate such multi-layer encryption, for instance, the password sharing system provides an initial public encryption key exchange from one or more client devices to an initial client device for the initial client device to utilize in encrypting a shared encryption key. The password sharing system receives (and the initial client device writes and provides) an encrypted payload and the shared encryption key, where the initial client device has encrypted the shared encryption key with the public encryption key(s) from the client device(s)). Upon receipt of the encrypted payload, the password sharing system stores the encrypted payload and shared encryption key in the shared folder. The password sharing system thus securely provides access to a set of passwords that goes beyond conventional-single-credential protection or standard public-private-key encryption—by limiting access to an encrypted payload within a shared folder to only devices that have the corresponding private keys to decrypt the shared encryption key.

In addition to the security protection offered by the shared-folder structure, the password sharing system also improves security of computing devices that share secure content by utilizing key rotation across client devices and user accounts. In particular, by detecting a change in membership of a shared folder or detecting some other key rotation event that triggers rotating a shared encryption key for authorized client devices, the password sharing system prevents undesired client devices from accessing encrypted content. More specifically, by rotating a shared encryption key that is utilized to encrypt a payload in a shared folder and updating public key sets for client devices in response to a key rotation event, the password sharing system can ensure that only client devices with current membership access to the shared content can decrypt the shared encryption key (and thus, the encrypted payload).

As noted above, conventional credential storage systems can introduce security risks by using a single or central credential that (if discovered) exposes passwords or using conventional public-private-encryption-key pairs that (when public keys are not updated) can continue to expose passwords or other secure data to a previous members that have left a sharing group. In contrast to such conventional systems, the password sharing system ensures that encryption keys held by former members of a shared folder cannot access the contents of the shared folder at any time after leaving the sharing membership—by automatically rotating the shared encryption key and re-encrypting the payload comprising the new shared encryption key upon detecting a key rotation event.

In addition to improved security, the password sharing system also protects against data loss or data corruption by providing the shared encryption key with the payload in the shared folder. For example, the password sharing system prevents data loss by ensuring that the shared encryption key is always included with the payload prior to committing the payload. Specifically, including the shared encryption key with the encrypted payload allows the password sharing system and client devices to verify the validity of a stored shared encryption key via a comparison between the current version of the shared encryption key and the version of the shared encryption key stored with the payload. Thus, the password sharing system can easily detect mismatched key versions and prevent storage of payloads with shared encryption keys that do not have the correct key version. By verifying the version of a shared encryption key used to encrypt a payload for a shared folder and storing the shared encryption key with the payload, the password sharing system also prevents data loss that would otherwise result from differences in encryption keys or payloads, as noted previously.

Additionally, the password sharing system provides flexibility via providing access to shared content via a shared folder. For instance, the password sharing system can utilize access control levels within a hierarchy of a shared folder (e.g., including subfolders) for specifying access to specific subfolders (e.g., passwords or password subgroups) for each client device with membership to the shared folder. The password sharing system can also specify the type of access that each client device has to each subfolder by indicating whether each client device can read and write to each subfolder and/or generate new subfolders (e.g., to view, change, or create new passwords). Accordingly, in combination with the key exchange and key rotation, the password sharing system can utilize the access control levels to provide a combination of access controls and encryption that securely and flexibly store passwords for access by a plurality of client devices and/or user accounts.

Turning now to the figures, FIG. 1 illustrates a schematic diagram of a system environment 100 in which a password sharing system 102 can operate. In particular, the system environment 100 includes server(s) 104 and client devices 106a-106n in communication via a network 108. Moreover, as shown, the server(s) 104 include a content management system 110, which includes the password sharing system 102. Additionally, the client devices 106a-106n can respectively include client applications 112a-112n.

As shown in FIG. 1, the server(s) 104 includes or hosts the content management system 110. In one or more embodiments, the content management system 110 includes, or is part of, one or more systems that implement the management of digital content items for storing, sharing, creating, modifying, or displaying digital content items for one or more users of the content management system 110 on one or more client devices (e.g., client devices 106a-106n). For example, the content management system 110 provides tools for viewing, generating, editing, sharing, or otherwise interacting with digital content items. To illustrate, the content management system 110 provides tools for generating or editing digital content items with text, images, or other media to the client devices 106a-106n via the client applications 112a-112n.

In some embodiments, the client applications 112a-112n comprise web browsers, applets, or other software applications (e.g., native applications) respectively available to the client devices 106a-106n. Additionally, in some instances, the content management system 110 provides data including instructions that, when executed by client devices 106a-106n, respectively create or otherwise integrate one of the client devices 106a-106n with an application or webpage. Relatedly, in some embodiments, the content management system 110 provides data for a remote graphical user interface (or other graphical user interfaces) to a client device (e.g., client device 106a) for a user to interact with digital content items via a client application (e.g., client application 112a) on the client device.

Furthermore, in one or more embodiments, the content management system 110 provides secure storage of digital security credentials (e.g., passwords, usernames) for sharing across a plurality of computing devices. For example, the content management system 110 includes the password sharing system 102 for storing and sharing a set of passwords for access by the client devices 106a-106n. Specifically, the password sharing system 102 communicates with a first client device of the client devices 106a-106n via the network 108 to obtain the set of passwords and store the set of passwords within a shared folder. The password sharing system 102 then provides access to the shared folder including the set of passwords to the client devices 106a-106n.

As used herein, the term "password" refers to a credential for accessing an account, digital content, a digital file or a computing device associated with a service, such as a series of characters or a code for accessing an account. Additionally, a password can include, or be associated with, additional login information, such as an account name (e.g., a username). Furthermore, a password can include other secure information that a service utilizes to identify a user or verify a login attempt to an account. In one or more additional embodiments, a password includes payment credentials (e.g., credit/debit card information) or membership information associated with one or more services. As used herein, the term "set of passwords" refers to one or more passwords. Additionally, set of passwords can include one or more subgroups of passwords, each including one or more separate passwords.

As further used herein, the term "shared folder" refers to a digital storage location or file for sharing digital content between two or more computing devices or users. For instance, a shared folder can include a digital storage location in a cloud storage medium that provides access to the digital storage location to two or more computing devices according to a shared-folder identifier. At least initially, a shared folder may not include a payload. Furthermore, a shared folder can include a hierarchy including one or more subfolders. Additionally, a shared folder can be a subfolder in another folder (e.g., a root folder including a user's personal passwords that are not shared with other users). A shared folder can also be one of a plurality of shared folders in a root folder, where each shared folder has its own sharing membership.

In one or more additional embodiments, the password sharing system 102 communicates with the client devices 106a-106n to exchange encryption keys in connection with sharing a set of passwords. In particular, the password sharing system 102 retrieves a public key set including public encryption keys from the client devices 106a-106n based on the client devices 106a-106n having membership access to a shared folder including the set of passwords. The password sharing system 102 can also provide the public encryption keys to one or more of the client devices 106a-106n in connection with obtaining a payload for storing within the shared folder.

As used herein, the term "public encryption key" (or "public key") refers to a cryptographic key as part of a public-private key pair associated with a client device or user that is widely distributed. In some cases, a first client device uses a public key of a second client device to encrypt digital data (e.g., for access by the second client device). Conversely, as used herein, the term "private encryption key" (or "private key") refers to a cryptographic key as part of a public-private key pair associated with a client device kept or stored privately by the client device. In some cases, the client device uses the private encryption key to decrypt digital data that was encrypted utilizing a corresponding public encryption key from the public-private key pair. Accordingly, a public encryption key is accessible to client devices that encrypt data for an owner client device to decrypt utilizing a corresponding private encryption key. As used herein, the term "public key set" refers to one or more public encryption keys associated with one or more client devices.

As further used herein, the term "payload" refers to data that is sent or transmitted from a sender computing device to a recipient computing device for storage at the recipient computing device. In some cases, the payload includes the intended digital data transmitted between such computing devices but excludes accompanying metadata or headers. For example, a payload can include a set of passwords that a client device sends to a storage system (e.g., a content management system) for storage within a shared folder accessible to one or more computing devices. In some embodiments, a payload can also include a set of passwords in a shared folder that a storage system sends to one or more client devices for storing locally at the one or more client devices. Furthermore, as used herein, the term "encrypted payload" refers to a payload that is encrypted via an encryption key.

As further indicated by FIG. 1, the password sharing system 102 also communicates with the client devices 106a-106n to perform key rotation in response to key rotation events associated with a shared folder. For instance, the password sharing system 102 detects key rotation events that indicate a time to renew an encryption key utilized to encrypt a payload of the shared folder. The password sharing system 102 can communicate with the client devices 106a-106n to update the public key set and provide the updated public key set to each client device with current access or membership to the shared folder. In one or more embodiments, one of the client devices 106a-106n rotates the shared encryption key, re-encrypts the payload of the shared folder, and provides the updated encrypted payload along with the shared encryption key (encrypted utilizing the updated public key set) to the password sharing system 102. The password sharing system 102 then provides access to the updated payload of the shared folder to the client devices 106a-106n via the network 108.

As used herein, the term "key rotation event" refers to a detected action or other indicator that initiates a rotation of an encryption key. For example, a key rotation event can trigger a renewal or modification of an encryption key by generating a new encryption key to replace an existing encryption key. In one or more embodiments, a key rotation event includes, but is not limited to, an indication of a change in a sharing membership for a shared folder, an indication of a command from a client device to change a shared encryption key, or an indication of a time threshold associated with the shared folder. Additionally, a key rotation event can include an initiation by the password sharing system in response to a manual request to rotate an encryption key (e.g., a request by a customer service agent on behalf of a user).

As further used herein, the term "sharing membership" refers to access permissions to a folder for one or more accounts or client devices. For instance, a sharing membership can include user identifiers, account identifiers, and/or device unique identifiers that are allowed to access a folder. In one or more embodiments, a sharing membership is stored in a metadata file or a database in connection with a folder for determining whether a given client device has access to a folder stored on the server(s) 104 in connection with the content management system 110 and/or the password sharing system 102.

In one or more embodiments, each of the client devices 106a-106n can include, but is not limited to, a mobile device (e.g., smartphone or tablet), a laptop, or a desktop, including those explained below with reference to FIG. 8. Furthermore, although not shown in FIG. 1, the client devices 106a-106n can be associated with one or more user accounts and operated by one or more users (e.g., users associated with the content management system 110) to perform a variety of functions. In particular, in one or more embodiments, the client devices 106a-106n perform functions, such as, but not limited to, accessing, viewing, and interacting with a variety of digital content (e.g., via the client applications 112a-112n). Additionally, the client devices 106a-106n also perform functions for generating, capturing, or accessing data to provide to the content management system 110 via the network 108. In one or more embodiments, one or more of the client devices 106a-106n perform operations for encrypting payloads and encrypting shared encryption keys to send to the password sharing system 102 in connection with sharing a set of passwords among the client devices 106a-106n.

In one or more embodiments, the server(s) 104 include a variety of computing devices, including those described below with reference to FIG. 8. For example, the server(s) 104 can include one or more servers for storing and processing data associated with digital content items (e.g., text, images, video, audio). The server(s) 104 can also include a plurality of computing devices in communication with each other, such as in a distributed storage environment. In some embodiments, the server(s) 104 comprise a content server. In one or more embodiments, the server(s) 104 can comprise an application server, a communication server, a web-hosting server, a social networking server, a digital content campaign server, or a digital communication management server.

Additionally, as shown in FIG. 1, the system environment 100 includes the network 108. The network 108 enables communication between components of the system environment 100. In one or more embodiments, the network 108 includes the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server(s) 104 and the client devices 106a-106n may communicate via the network 108 using a variety of communication platforms and technologies suitable for transporting data and/or communication signals, including any known communication technologies, devices, media, and protocols supportive of data communications, examples of which are described with reference to FIG. 8.

Although FIG. 1 illustrates the server(s) 104 and the client devices 106a-106n communicating via the network 108, the various components of the system environment 100 alternatively communicate and/or interact via other methods (e.g., the server(s) 104 and the client devices 106a-106n communicate directly). Furthermore, although FIG. 1 illustrates the password sharing system 102 being implemented by a particular component and/or device within the system environment 100, the password sharing system 102 can be implemented, in whole or in part, by other computing devices and/or components in the system environment 100. For instance, at least part of the password sharing system 102 can be implemented within one or more of the client devices 106a-106n.

Figure 2A:
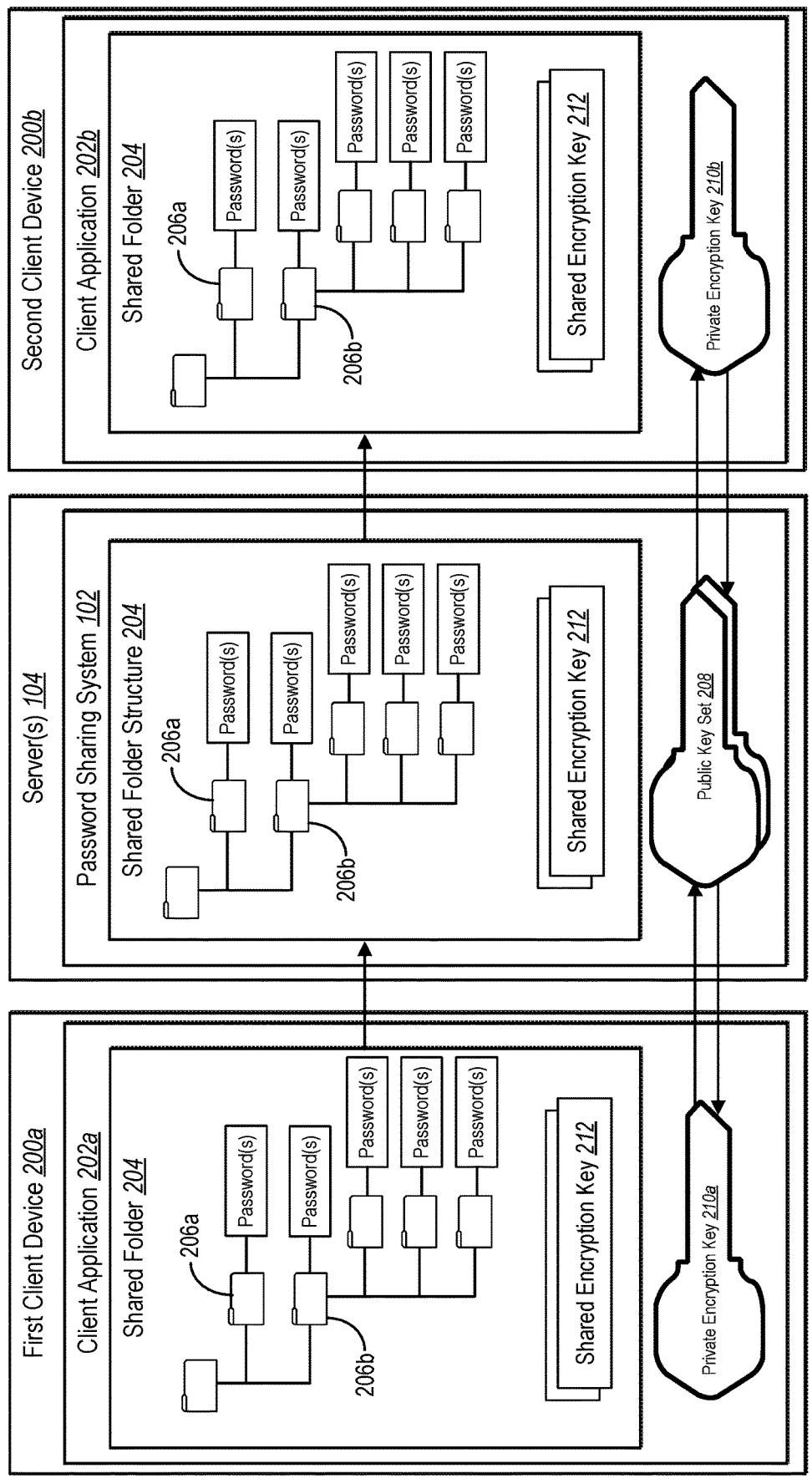
FIGS. 2A-2B illustrate diagrams of the password sharing system managing a set of passwords in a shared folder and rotating shared encryption keys for a plurality of client devices in accordance with one or more implementations.
Figure 2B:
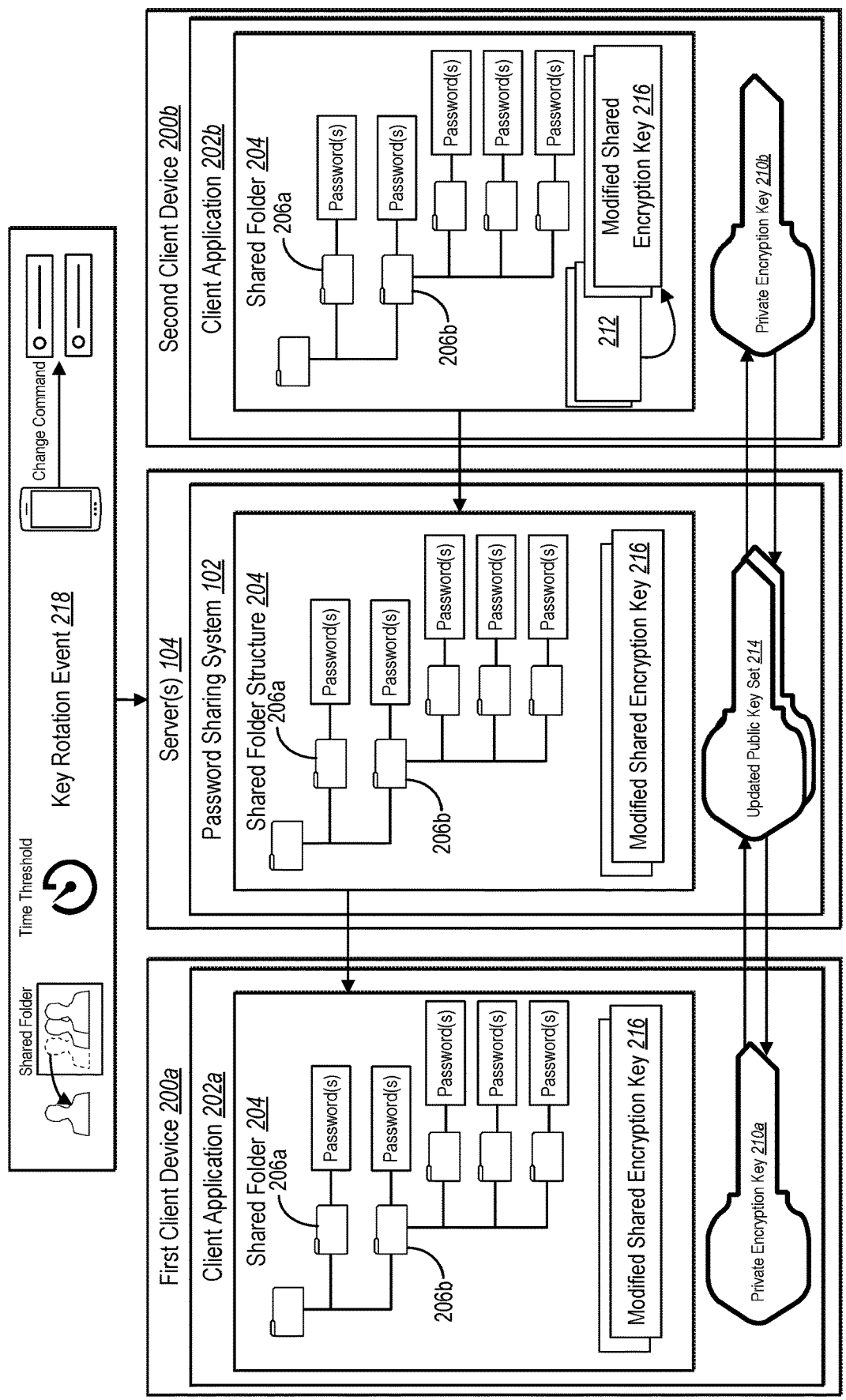

As mentioned, the password sharing system 102 can utilize key exchange and key rotation in connection with a shared folder to provide secure access to a shared folder to a plurality of client devices. FIGS. 2A-2B illustrate diagrams of a shared folder accessible to a plurality of client devices and a plurality of encryption keys associated with operations for securely sharing the contents of the shared folder across the plurality of client devices. Specifically, FIG. 2A illustrates an initial key exchange between a plurality of client devices, and FIG. 2B illustrates a key rotation to a modified shared encryption key shared between the plurality of client devices.

FIG. 2A illustrates an environment including server(s) 104, a first client device 200a, and a second client device 200b. In one or more embodiments, the server(s) 104 include the password sharing system 102 for managing a shared folder associated with the first client device 200a and the second client device 200b. For example, the server(s) 104 host the shared folder and provide access to the shared folder to the first client device 200a and the second client device.

According to one or more embodiments, the first client device 200a utilizes a client application 202a to generate a shared folder 204. For instance, the first client device 200a (e.g., based on being associated with an owner/manager account of the shared folder 204) utilizes a content sharing application to send a request to the password sharing system 102 at the server(s) 104 to generate the shared folder 204 at the server(s) 104. In connection with generating the shared folder 204, the first client device 200a can also indicate a sharing membership associated with the shared folder 204 including the first client device 200a and the second client device 200b.

In one or more embodiments, the shared folder 204 includes a set of passwords for sharing with the first client device 200a and the second client device 200b. To illustrate, the shared folder 204 can include one or more passwords associated with one or more services. Additionally, as illustrated in FIG. 2A, the shared folder 204 can include one or more subfolders (e.g., a first subfolder 206a and a second subfolder 206b) including different sets of passwords for sharing with different client devices. For example, the password sharing system 102 can establish separate access permissions for each client device relative to each subfolder within the shared folder 204 based on password permissions associated with passwords.

As used herein, the term "password permission" refers to a designated access by a user or a user account to a password. For example, a password permission can indicate whether a given account can view, use, or change a particular password for a service. Additionally, as used herein, the term "access permission" refers to designated access by a user or a user account to a folder. For instance, an access permission can indicate an access control level assigned to a user account for a given folder or subfolder including a set of passwords. In one or more embodiments, access permissions to a particular folder are based on password permissions corresponding to one or more passwords within the folder.

When requesting that the password sharing system 102 generates the shared folder 204, in some embodiments, the first client device 200a initially generates the shared folder 204 and a corresponding hierarchy locally on the first client device 200a. Additionally, the first client device 200a can store the set of passwords within the shared folder 204 within a local storage of the client device 200a. The first client device 200a can then send the request to the password sharing system 102 to generate the shared folder 204 with the corresponding hierarchy on the server(s) 104 in preparation for delivering a payload corresponding to the shared folder 204 to the password sharing system 102.

In response to receiving a request to generate a shared folder, the password sharing system 102 generates the shared folder 204 including the corresponding hierarchy at the server(s) 104. Prior to receiving a payload for storing within the shared folder 204, the password sharing system 102 retrieves a public key set 208 including at least one public encryption key associated with the second client device 200b. For instance, the password sharing system 102 obtains the public encryption key associated with the second client device 200b from public encryption keys previously cached for client devices that registered with the password sharing system 102. In some embodiments, the password sharing system 102 also retrieves a public encryption key associated with the first client device 200a to include within the public key set 208. For example, the password sharing system 102 can obtain public encryption keys associated with private encryption keys (e.g., a first private encryption key 210a and a second private encryption key 210b) associated with the first client device 200a and the second client device 200b. The password sharing system 102 can then provide the public key set 208 to the first client device 200a.

As further illustrated by FIG. 2A, the first client device 200a utilizes a shared encryption key 212 to encrypt a payload (e.g., the set of passwords) associated with the shared folder 204. As used herein, the term "shared encryption key" (or "shared key") refers to a cryptographic key utilized to encrypt and/or decrypt a payload for a shared folder. For example, a shared encryption key includes a key that is accessible to a plurality of client devices to encrypt and decrypt a set of passwords shared among the client devices. Additionally, as illustrated in FIG. 2A, the first client device 200a stores an encrypted version of the shared encryption key 212 (rather than an unencrypted version of the shared encryption key 212) with the encrypted payload within the shared folder 204.

In one or more embodiments, as mentioned, the first client device 200a encrypts the shared encryption key 212 for storing within the shared folder 204 with the encrypted payload. For example, the first client device 200a encrypts the shared encryption key 212 utilizing the public key set 208 received from the password sharing system 102. Accordingly, the first client device 200a generates a list of encrypted versions of the shared encryption key 212 utilizing (i) a public encryption key associated with the second client device 200b and (ii) any additional public encryption keys associated with any additional client devices having membership access to the shared folder 204 via the password sharing system 102. By encrypting the shared encryption key 212 utilizing the public key set 208, the first client device 200a prevents access to the shared encryption key 212 to client devices that do not have membership access to the shared folder 204. FIG. 2A illustrates the encrypted versions of the shared encryption key 212 stored with the payload of the shared folder 204 (e.g., as a list of encrypted shared encryption keys).

Additionally, in one or more embodiments, the first client device 200a uploads an unencrypted version of the shared encryption key 212 in a user-specific key set maintained at the password sharing system 102 (e.g., for later use). For example, if a sharing membership of the shared folder 204 does not include any other users, the first client device 200a encrypts the payload utilizing the shared encryption key 212 but does not share the shared encryption key 212 with other client devices via the password sharing system 102. The first client device 200a can also store other keys in the user-specific key set that are not shared with other users via the password sharing system 102.

After encrypting the payload of the shared folder 204 using the shared encryption key 212 and encrypting the shared encryption key 212 using the public key set 208, the first client device 200a transmits the encrypted payload and the encrypted shared encryption key 212 to the password sharing system 102 for storage within the shared folder 204 at the server(s) 104. Furthermore, the password sharing system 102 provides access to the contents of the shared folder 204 to the second client device 200b via a client application 202b based on the second client device 200b having membership access to the shared folder 204. Thus, the second client device 200b (or other client device) can request to download (e.g., synchronize) the shared folder 204 from the server(s) 104 to the second client device 200b (or corresponding client device).

In response to receiving a request by the second client device 200b to download the shared folder 204, the password sharing system 102 can send the encrypted payload and the encrypted shared encryption key 212 to the second client device 200b. After receiving the encrypted payload and encrypted shared encryption key 212 from the server(s) 104, the second client device 200b can decrypt the shared encryption key 212 utilizing the second private encryption key 210b. The second client device 200b can then decrypt the encrypted payload utilizing the shared encryption key 212 to access the contents (e.g., the set of passwords) in the shared folder 204.

As mentioned previously, the password sharing system 102 can also utilize different access control levels to restrict access to one or more passwords or groups of passwords to one or more client devices. For instance, the password sharing system 102 can utilize access control levels of subfolders to allow the first client device 200a to access to the first subfolder 206a and the second subfolder 206b—while allowing the second client device 200b to access only the first subfolder 206a. Additionally, the password sharing system 102 can assign different types of access control levels to different client devices, such as allowing the first client device 200a to read and write to any subfolder within the shared folder 204 while only allowing the second client device 200b to read the contents of the first subfolder 206a.

As illustrated in FIG. 2B, the password sharing system 102 also rotates keys in connection with the shared folder 204. Specifically, the password sharing system 102 detects key rotation events for rotating the shared encryption key 212 shown in FIG. 2A. As shown in FIG. 2B, the password sharing system 102 detects a key rotation event 218 including one of a plurality of possible events that cause the password sharing system 102 to initiate a process to modify the shared encryption key 212. For example, as previously mentioned and as depicted in FIG. 2B, the key rotation event 218 can include, but is not limited to, a change in a shared membership of a shared membership for the shared folder 204, a request to rotate the shared encryption key 212, or a time threshold associated with the shared folder 204. Thus, the key rotation event 218 indicates that one or more client devices should no longer have access to the previous shared encryption key 212.

To rotate the shared encryption key 212, the password sharing system 102 retrieves an updated public key set 214 by requesting public encryption keys from client devices with current membership access to the shared folder 204. For instance, as FIG. 2B illustrates, the password sharing system 102 determines that the first client device 200a and the second client device 200b have membership access to the shared folder 204 after the key rotation event 218 and obtain public encryption keys from the first client device 200a and the second client device 200b. Additionally, the password sharing system 102 provides the updated public key set 214 to the first client device 200a and the second client device 200b.

In one or more embodiments, in response to receiving an indication of the key rotation event 218 and receiving the updated public key set 214 from the password sharing system 102, the first client device 200a and the second client device 200b race to generate a new shared encryption key. As illustrated in FIG. 2B, the second client device 200b is the first to generate a modified shared encryption key 216 (e.g., by rotating the shared encryption key 212 to the modified shared encryption key 216) and then utilize the modified shared encryption key 216 to re-encrypt the payload of the shared folder 204. The second client device 200b also encrypts the modified shared encryption key 216 (e.g., by generating a plurality of encrypted versions of the modified shared encryption keys) utilizing the updated public key set 214 and then provides the encrypted payload and encrypted version(s) of the modified shared encryption key 216 to the password sharing system 102 for storage in the shared folder 204. FIG. 2B illustrates that the shared folder structure 204 includes encrypted version(s) of the modified shared encryption key 216.

As further illustrated by FIG. 2B, the password sharing system 102 synchronizes the contents of the shared folder 204 with the first client device 200a by sending the re-encrypted payload with the modified shared encryption key 216 to the first client device 200a. For instance, the password sharing system 102 can synchronize the contents of the shared folder 204 with the first client device 200a in response to receiving a request from the first client device 200a to synchronize the shared folder 204. After receiving the re-encrypted payload and the modified shared encryption key 216 (which has been encrypted utilizing the updated public key set 214), the first client device 200a can decrypt the modified shared encryption key 216 utilizing the first private encryption key 210a. The first client device 200a can also decrypt the encrypted payload utilizing the modified shared encryption key 216 and then access the contents of the shared folder 204.

Figure 3A:
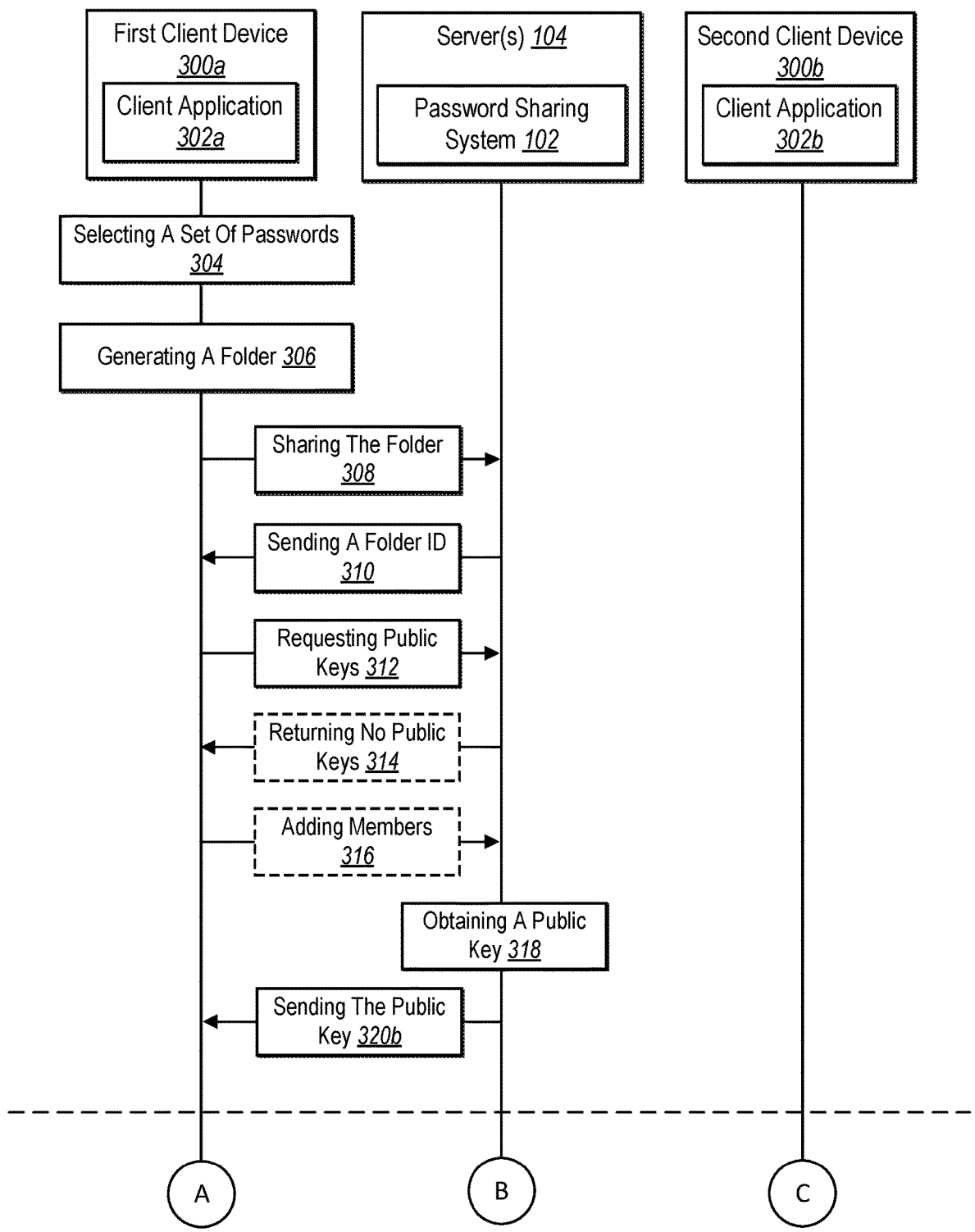
FIGS. 3A-3B illustrates a flow diagram illustrating operations for the password sharing system to encrypt a payload for a shared folder utilizing a shared encryption key and public encryption keys in accordance with one or more implementations.
Figure 3B:
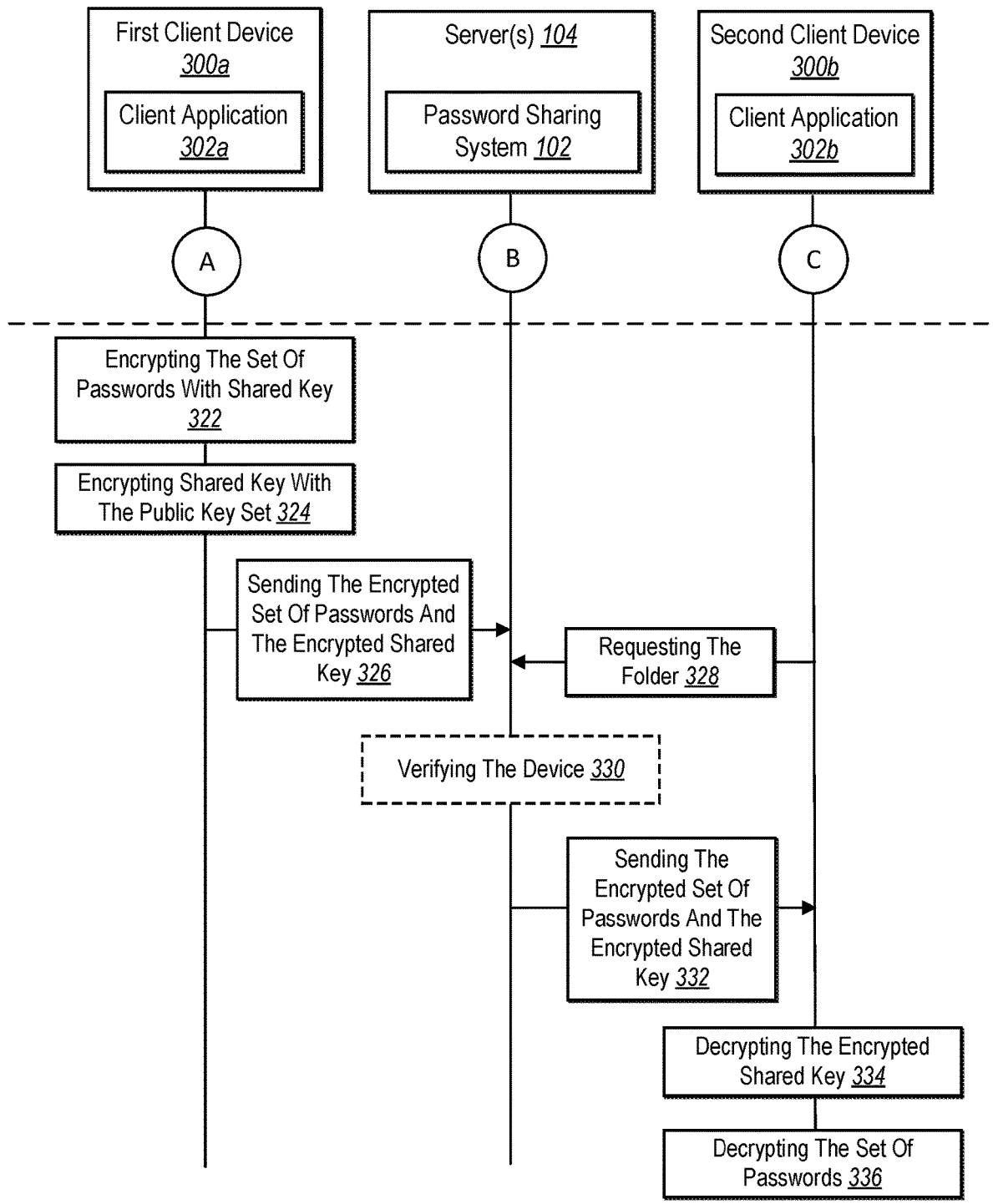

FIGS. 3A-3B illustrate a flowchart of acts for sharing a set of passwords across a plurality of client devices. In particular, as illustrated in FIGS. 3A-3B, the server(s) 104 including the password sharing system 102 can communicate with a first client device 300a and a second client device 300b to share the set of passwords. The first client device 300a includes a first client application 302a, and the second client device 300b includes a second client application 302b, to facilitate such communication and password sharing, among other things.

As shown in FIG. 3A, the first client device 300a initiates a process of sharing a set of passwords with the second client device 300b by performing an act 304 of selecting a set of passwords. For example, the first client device 300a receives an input by a first user associated with the first client device 300a to share the set of passwords with one or more other users. The first client device 300a then determines one or more passwords associated with one or more services to share with the one or more other users. The first client device 300a then performs an act 306 of generating a folder on the first client device 300a. To illustrate, the first client device 300a generates the folder to store the selected set of passwords on a local storage of the first client device 300a or in a virtual storage (e.g., a temporary storage) indicating how the set of passwords will be stored on the server(s) 104. Accordingly, the first client device 300a can set up a folder hierarchy with any number of subfolders for storing the set of passwords within the generated folder.

As further shown in FIG. 3A, the first client device 300a performs an act 308 of sharing the folder with one or more additional client devices. In one or more embodiments, the first client device 300a is associated with an account of a content management system that includes the password sharing system 102 (e.g., the content management system 110 of FIG. 1). A user of the account can log in to the account within the first client application 302a at the first client device 300a and then cause the first client device 300a to access digital content from the server(s) 104, store digital content on the server(s) 104, and/or share digital content with one or more other accounts via the server(s) 104. For example, the first client device 300a can send an indication of the one or more other accounts to the password sharing system 102 to share the folder with one or more additional client devices associated with the one or more other accounts (e.g., the second client device 300b associated with an additional account).

In one or more embodiments, the password sharing system 102 provides an application programming interface ("API") for client devices to send commands to the password sharing system 102 to cause the password sharing system 102 to perform various operations. For example, the password sharing system 102 provides an API for synchronizing data (e.g., passwords) between client devices and the server(s) 104. To illustrate, the API for synchronizing data can include a plurality of API calls to perform functions associated with a variety of operations (e.g., list, download, upload operations). Accordingly, in one or more embodiments, the first client device 300a shares the folder via the password sharing system 102 by issuing a "share folder" API call to the password sharing system 102.

As further illustrated in FIG. 3A, after the first client device 300a shares the folder, the password sharing system 102 performs an act of sending a folder identifier ("ID") 310 to the first client device 300a in response to the first client device 300a sharing the folder. For example, the password sharing system 102 can generate a folder on the server(s) 104 that mirrors a structure of the folder on the first client device 300a. Specifically, the generated folder at the server(s) 104 can be an empty folder serving as a placeholder for receiving content from the first client device 300a for storing in the folder. Alternatively, the password sharing system 102 generates a folder on the server(s) 104 in response to a request via a web interface to generate a new folder structure (e.g., a folder structure that does not exist on a local storage of the first client device 300a). The password sharing system 102 can then determine a folder ID corresponding to the generated folder (e.g., a root folder) on the server(s) 104 and return the folder ID (e.g., "share_folder_id: 1") to the first client device 300a.

As further illustrated in FIG. 3A, in response to receiving the folder ID indicating that the password sharing system 102 has generated the shared folder at the server(s) 104, the first client device 300a performs an act 312 of requesting public keys from the password sharing system 102. For instance, the first client device 300a can send a request (e.g., a "get public keys" API call) to the password sharing system 102 to provide one or more public keys to use for preparing to upload contents of the folder to the password sharing system 102.

In one or more embodiments, in response to the request for public keys from the first client device 300a, the password sharing system 102 can identify one or more additional client devices that have membership access to the shared folder. For instance, the password sharing system 102 can maintain a shared membership for the folder indicating one or more accounts having membership access to the folder. Additionally, the password sharing system 102 can identify the one or more additional client devices by determining one or more client devices associated (e.g., registered) with the one or more accounts having membership access to the folder.

As further depicted in FIG. 3A, the password sharing system 102 optionally performs an act 314 of returning no public keys to the first client device 300a. In particular, the password sharing system 102 can determine that no additional accounts have a sharing membership in the folder (i.e., an owner account of the folder has not shared the folder with any other accounts). The password sharing system 102 can determine that the folder is not associated with any public encryption keys based on the folder having no additional accounts associated with a sharing membership in the folder. Accordingly, in such cases, the password sharing system 102 can send a message or signal to the first client device 300a to indicate that the password sharing system 102 does not have any public encryption keys for the folder based on no additional client devices being associated with a sharing membership for the folder.

As also illustrated in FIG. 3A, the first client device 300a optionally performs an act 316 of adding members to the folder. Specifically, the first client device 300a can add one or more accounts to a sharing membership associated with the folder in response to a user input to add one or more users to the folder via the first client application 302a. The first client device 300a then sends indications of the added member(s) (e.g., an "add members" API call) to the password sharing system 102 by providing one or more account identifiers, user identifiers, or device unique identifiers associated with the added member(s) to the password sharing system 102. Although FIG. 3A illustrates a single operation to add members to the folder, the first client device 300a can add members to the folder at any time after initially generating the shared folder (e.g., to add members to a previously generated/existing shared folder).

As further shown in FIG. 3A, the password sharing system 102 performs an act 318 of obtaining a public key associated with the second client device 300b. For example, the password sharing system 102 determines that the second client device 300b is associated with an account of a user of the content management system 110. In one or more embodiments, the password sharing system 102 obtains a public encryption key associated with the second client device 300b based on the account having membership access to the folder according to a sharing membership for the folder. In some cases, the password sharing system 102 previously received the public encryption key from the second client device 300b upon registration of the second client device 300b with the password sharing system 102. Alternatively, the password sharing system 102 can obtain the public encryption key at any time after the second client device 300b is registered with the password sharing system 102 (e.g., at the time of adding the account of the user to the sharing membership of the shard folder.

As mentioned above, the first client device 300a can provide a sharing membership to the password sharing system 102 after sharing the folder. Although such membership can be shared or expanded, in one or more embodiments, the password sharing system 102 accesses a previously existing sharing membership to identify the second client device 300b (e.g., based on the shared folder being associated with one or more existing shared folders having the same sharing membership).

As further illustrated in FIG. 3A, the second client device 300b performs an act 320 of sending the public key to the password sharing system 102. In one or more embodiments, the second client device 300b obtains a public encryption key corresponding to a public-private key pair associated with the second client device 300b. For example, the second client device 300b can generate a public-private key pair or access an existing public-private key pair when registering with the password sharing system 102 and send the public encryption key to the password sharing system 102 upon registering while retaining the private encryption key on the second client device 300b.

As further illustrated in FIG. 3A, after receiving the public key, the password sharing system 102 performs an act 320b of sending the public key to the first client device 300a. For instance, the password sharing system 102 determines a public key set including the public encryption key retrieved from the second client device 300b. In one or more embodiments, the password sharing system 102 also retrieves one or more additional public encryption keys from one or more additional client devices having membership access to the folder. The password sharing system 102 can include the one or more additional public encryption keys in the public key set with the public encryption key from the second client device 300b. The password sharing system 102 then sends the public key set to the first client device 300a.

As depicted in FIG. 3B, the first client device 300a also performs an act 322 of encrypting the set of passwords with a shared key. In one or more embodiments, the first client device 300a generates a shared encryption key for encrypting a payload associated with the folder. The first client device 300a then encrypts the payload (e.g., the set of passwords according to the hierarchy of the folder) utilizing the shared encryption key, resulting in an encrypted payload (e.g., a payload inaccessible without the use of the shared encryption key). In some embodiments, the first client device 300a encrypts the payload prior to receiving the public key set from the password sharing system 102. In alternative embodiments, the first client device 300a encrypts the payload after receiving the public key set from the password sharing system 102.

As further illustrated in FIG. 3B, the first client device 300a performs an act 324 of encrypting the shared key with the public key set. In particular, after encrypting the payload utilizing the shared encryption key, the first client device 300a then utilizes the public key set to encrypt the shared encryption key. For example, the first client device 300a generates an encrypted version of the shared encryption key by utilizing the public encryption key associated with the second client device 300b. Additionally, the first client device 300a can generate separate encrypted versions of the shared encryption key by utilizing one or more additional public encryption keys included in the public key set.

After encrypting the shared encryption key with the public key set, the first client device 300a performs an act 326 of sending the encrypted set of passwords and the encrypted shared key to the password sharing system 102. Specifically, after encrypting the shared encryption key that the first client device 300a utilized to encrypt a payload associated with the folder, the first client device 300a sends the payload and the encrypted version of the shared encryption key to the password sharing system 102 for storage within the folder. For example, the first client device 300a uploads the encrypted payload and encrypted shared encryption key to a location on the server(s) 104 corresponding to the folder utilizing the folder ID. The password sharing system 102 can then store the encrypted payload and the encrypted shared encryption key within the folder.

As further illustrated in FIG. 3B, as the password sharing system 102 receives the encrypted set of passwords and the encrypted shared encryption key, the second client device 300b performs an act 328 of requesting the folder from the password sharing system 102. In one or more embodiments, after the first client device 300a uploads the contents of the folder to the password sharing system 102, any client device with current membership access to the folder can request access to the folder. Thus, the second client device 300b can send a request (e.g., a "list folder" API call, which lists the latest changes to the passwords in the shared folder) to the password sharing system 102 to provide the contents of the folder to the second client device 300b. In one or more embodiments, a "list folder" API call returns a snapshot of all shared folders to which the second client device 300b has access.

In some cases, as illustrated in FIG. 3B, the password sharing system 102 optionally performs an act 330 of verifying the device. For example, in response to determining that the request for the folder is unverified (e.g., the request for the folder is the first request made by the second client device 300b to the password sharing system 102), the password sharing system 102 can verify the identity of the second client device 300b. To illustrate, the password sharing system 102 can obtain a device unique identifier (e.g., an identifier indicating the specific instance of the second client application 302b) for the second client device 300b and verify that the device identifier is associated with a registered account having membership access to the folder. Alternatively, the password sharing system 102 can verify the identifier of the second client device 300b via an email identification associated with an account of the second client device 300b. In one or more additional embodiments, the password sharing system 102 can determine that the second client device 300b is not associated with an existing account and then require a user associated with the second client device 300b to establish an account for verification.

Independent of whether the password sharing system 102 verifies a device—after receiving a request for the contents of the folder from the second client device 300b—the password sharing system 102 performs an act 332 of sending the encrypted set of passwords and the encrypted shared key received from the first client device 300a to the second client device 300b. In one or more embodiments, in response to a request by the second client device 300b for the folder (e.g., a "download" API call), the password sharing system 102 determines a payload (encrypted) associated with the folder and then transmits the payload to the second client device 300b. Additionally, the password sharing system 102 transmits the encrypted shared encryption key stored within the folder to the second client device 300b along with the payload (e.g., without accessing the contents of the shared folder including the encrypted shared encryption key).

As further illustrated in FIG. 3B, the second client device 300b performs an act 334 of decrypting the encrypted shared key. Specifically, after receiving the encrypted payload and the encrypted shared encryption key from the password sharing system 102 for the folder, the second client device 300b utilizes a private encryption key to decrypt the shared encryption key. More specifically, the second client device 300b utilizes the private encryption key from the public-private key pair associated with the public encryption key—which the password sharing system 102 previously retrieved from the second client device 300b—to decrypt the shared encryption key.

As finally shown in FIG. 3B, the second client device 300b performs an act 336 of decrypting the set of passwords. For instance, after decrypting the shared encryption key, the second client device 300b utilizes the shared encryption key to decrypt the encrypted payload received from the password sharing system 102. Accordingly, the second client device 300b decrypts the contents of the folder shared by the first client device 300a. The second client device 300b can then access the contents of the folder to access one or more passwords from the set of passwords.

In one or more embodiments, as previously mentioned, the password sharing system 102 utilizes various access permissions to restrict the access of the second client device 300b. For example, the password sharing system 102 can assign access control levels to one or more subfolders within the folder to allow the second client device 300b to read and/or write to the corresponding subfolder(s). Additionally, the password sharing system 102 can utilize the access permissions to restrict access to the second client device 300b to one or more other subfolders within the folder. Thus, after the second client device 300b decrypts the payload of the folder, the password sharing system 102 can utilize the access permissions to grant or restrict different levels of access to the second client device 300b to one or more passwords of the set of passwords according to the established access controls.

As mentioned previously, the password sharing system 102 can provide an API that client devices can access to perform various operations associated with accessing a shared folder including a set of passwords. In one or more embodiments, the API includes list (e.g., "list folders" and "longpoll"), download, and upload operations. To utilize the API for password namespaces (e.g., spaces that are unmounted) when changing a sharing membership associated with a shared set of passwords, the password sharing system 102 can modify an existing API to include additional calls. Furthermore, the password sharing system 102 can modify identifier values in an account's password namespace, thus effectively committing a new entry without the new entry existing. For example, the password sharing system 102 can include a set of API calls to return changes to a set of passwords in a shared folder and/or a sharing status for verification with the shared folder (e.g., "list folder," "list folder continue"), obtain a most recent cursor (e.g., "get latest cursor"), or obtain an existing longpoll for the shared folder (e.g., "longpoll").

Additionally, in one or more embodiments, the password sharing system 102 limits interactions with the API to one or more specific client applications on user client devices. For example, a client application accessing the password sharing system 102 can include a password storage application for accessing, within a single application, a plurality of passwords or credentials associated with a plurality of different services. In some instances, the password application can interact with other client applications (e.g., a web browser) to automatically populate credential fields within the other client applications. Accordingly, the password sharing system 102 can provide improved security by blocking API access to non-approved client applications.

In addition to the key exchange described above, in one or more additional embodiments, the password sharing system 102 utilizes a protocol for persisting key transfer intentions and key transfer outcomes in connection with key exchanges for a shared folder including passwords. In particular, one or more devices with access to a shared folder may not always be available. Thus, transferring keys solely based on notifications may not be reliable. To overcome such deficiencies, the password sharing system 102 persists a key transfer intention on the server(s) 104 in connection with an operation to send public encryption keys to client devices. When a client device issues a "list folder" call, the password sharing system 102 can query the number of pending key requests for shared encryption keys for shared folders on the password namespaces. The password sharing system 102 then passes the public encryption keys down as part of the sharing status of the client device. Furthermore, the key transfer outcome materializes in the payload received from the client device.

Figure 4A:
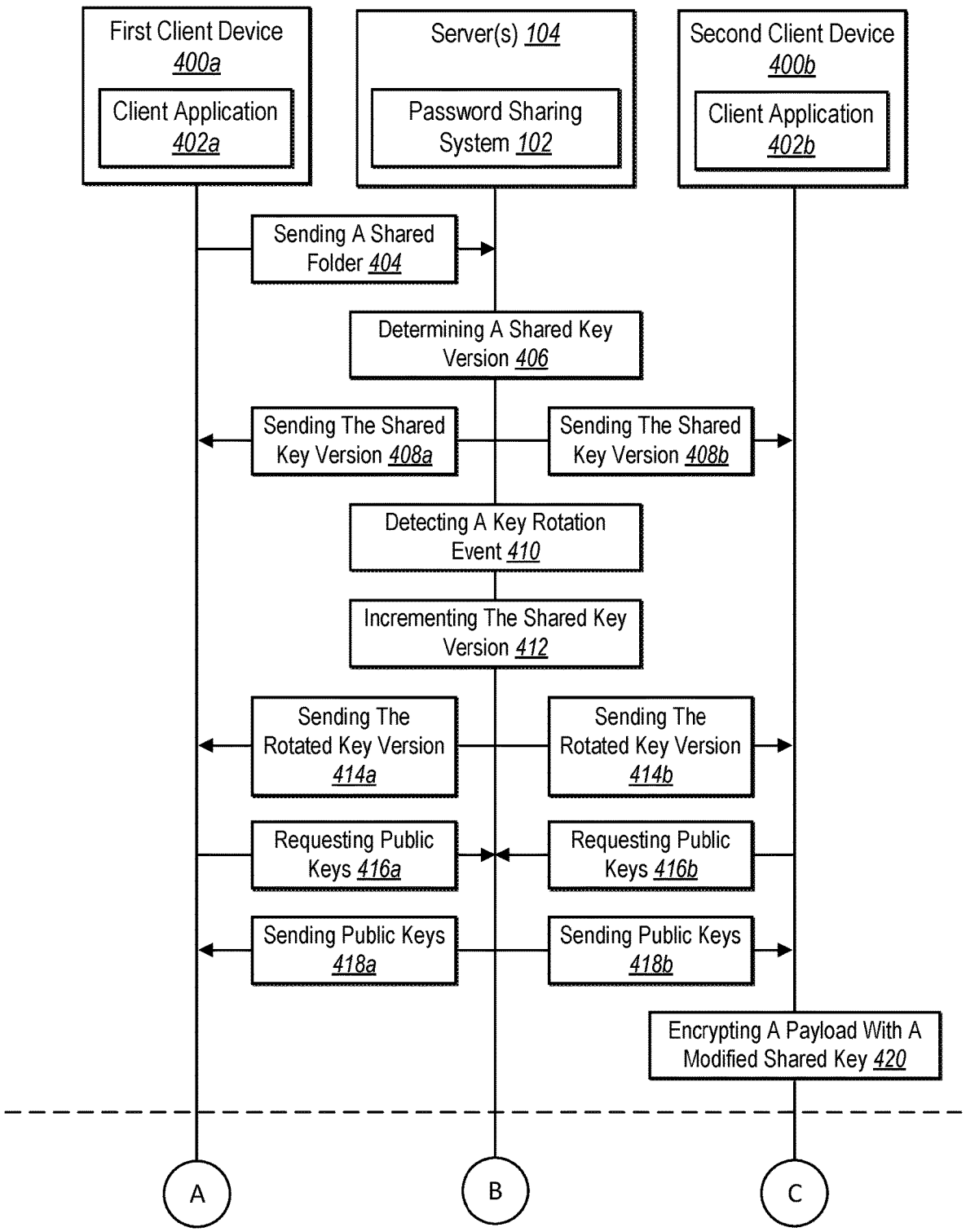
FIGS. 4A-4B illustrates a flow diagram illustrating operations for the password sharing system to rotate a shared encryption key for a shared folder in response to a key rotation event in accordance with one or more implementations.
Figure 4B:
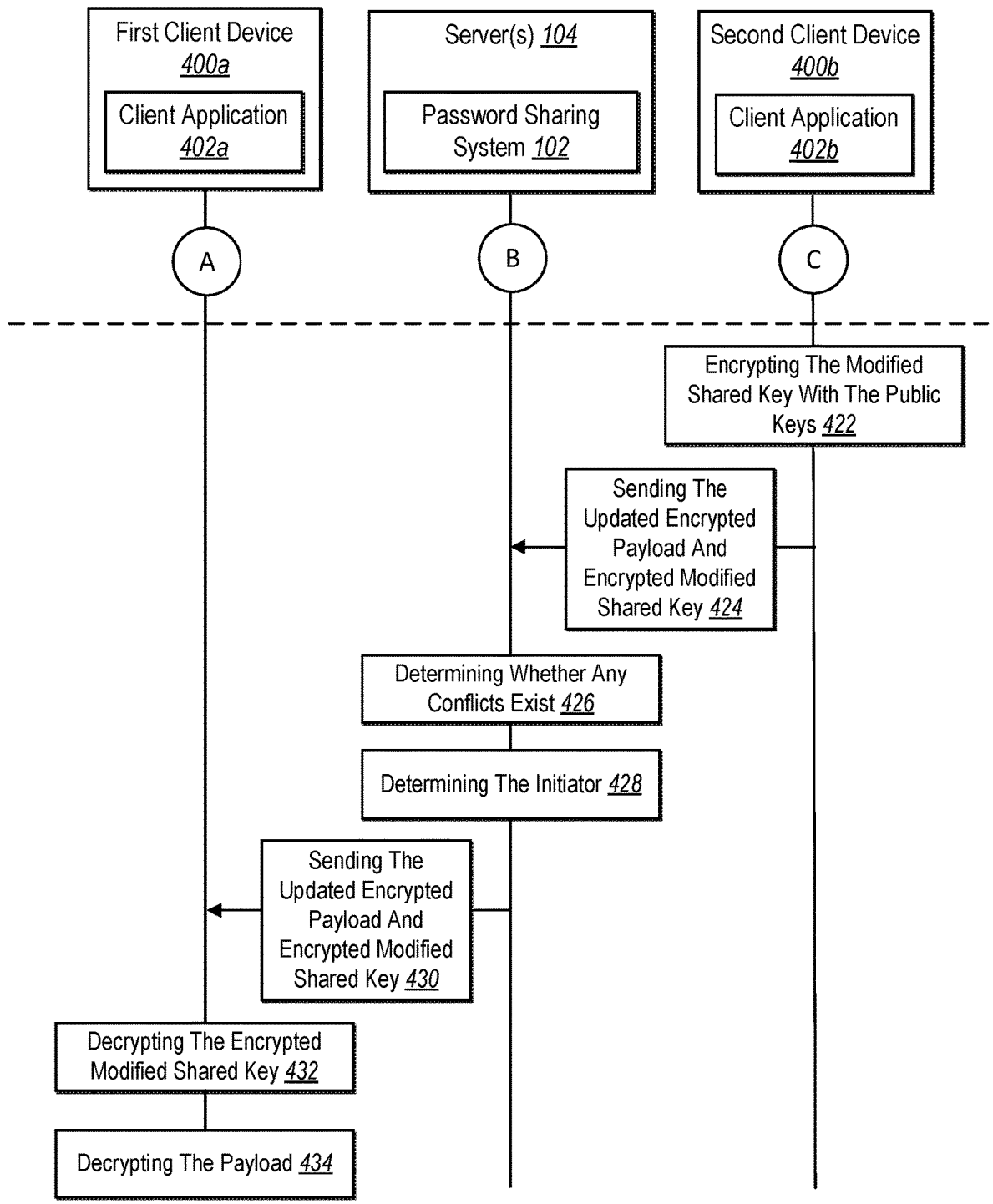

As previously mentioned, the password sharing system 102 can rotate keys in connection with sharing passwords among a plurality of client devices. FIGS. 4A-4B illustrate a flowchart for the password sharing system 102 on server(s) 104 rotating a shared encryption key associated with a shared folder involving a first client device 400a and a second client device 400b. The first client device 400a includes a first client application 402a, and the second client device 400b includes a second client application 402b, to facilitate rotating the shared encryption key, among other things.

As illustrated in FIG. 4A, the first client device 400a performs an act 404 of sending a shared folder to the password sharing system 102. In one or more embodiments, an initial client device (e.g., the first client device 400a) generates the shared folder for sharing with one or more other client devices. For example, the shared folder can be associated with a sharing membership indicating one or more accounts having access to the shared folder. The password sharing system 102 can determine client devices (e.g., the second client device 300b) associated with the account(s) having access to the shared folder. As described above with respect to FIGS. 3A-3B, the password sharing system 102 receives an encrypted payload and an encrypted shared encryption key from a client device in connection with the shared folder.

As further illustrated in FIG. 4A, the password sharing system 102 performs an act 406 of determining a shared key version. In one or more embodiments, the password sharing system 102 stores a version number for a shared encryption key associated with a shared folder. For instance, in response to a first request to share/create a folder, the password sharing system 102 can store an identifier indicating that the shared encryption key is a first version (e.g., "key_version=1"). Additionally, if a shared encryption key has previously been renewed/rotated, the version number reflects the current version of the shared encryption key.

After determining a shared key version, the password sharing system 102 performs acts 408a-408b of sending the shared key version to the first client device 400a and the second client device 400b. Specifically, after the password sharing system 102 generates a shared folder associated with a shared encryption key, the password sharing system 102 can send a version number of the shared encryption key to client devices having membership access to the shared folder. For example, the password sharing system 102 sends the version number of the shared encryption key to the client devices to allow the client devices to check synchronization accuracy between the individual client devices and the stored version on the server(s) 104.

As indicated above, various key rotation events can trigger the password sharing system 102 to rotate a shared encryption key. As illustrated in FIG. 4A, the password sharing system 102 performs an act 410 of detecting a key rotation event. For example, the password sharing system 102 can detect an event indicating that the shared encryption key should be rotated such that outdated keys cannot decrypt a payload of a shared folder.

To illustrate a key rotation event, as previously mentioned, the password sharing system 102 can detect that a sharing membership associated with the shared folder has changed (e.g., by removing access to one or more user accounts and/or client devices). In another example, the password sharing system 102 can receive a request to rotate the shared encryption key (e.g., a request from a client device of an owner of the shared folder or a request by a client device indicating that the shared encryption key is corrupted or compromised). Alternatively, the password sharing system 102 can detect that a time threshold has been reached associated with the current shared encryption key. In one or more additional embodiments, only the password sharing system 102 is able to detect key rotation events, resulting in the password sharing system 102 being the only source that can initiate key rotation operations at one or more client devices.

As further shown in FIG. 4A, the password sharing system 102 performs an act 412 of incrementing the shared key version. In particular, the password sharing system 102 increments the version number stored for the shared encryption key associated with the shared folder. To illustrate, in response to detecting the key rotation event, the password sharing system 102 increments the version number from "key_version=1" to "key_version=2." The password sharing system then stores the new version number in connection with the shared folder and notifies the client devices having membership access to the shared folder. In one or more embodiments, the password sharing system 102 increments the version number monotonically.

In one or more additional embodiments, the password sharing system 102 increments the version number according to the following formula: $K_{new}=\max(K_{old}+1, \text{Now}()$. milliseconds), in which K represents a shared encryption key. In particular, the password sharing system 102 can compare a value of an old/previous key version number incremented by one (e.g., "$K_{old}+1$") to a current time value that the password sharing system 102 retrieves (e.g., "Now( ).milliseconds"). The password sharing system 102 can then select the maximum value of the two values and set the new key version number $K_{new}$ as the maximum value.

As further illustrated in FIG. 4A, the password sharing system 102 performs acts 414a-414b of sending the rotated key version to the first client device 400a and the second client device 400b. Specifically, the password sharing system 102 sends the updated version number for the shared encryption key to each of the client devices having membership access to the shared folder. For example, in response to incrementing the version number of the shared encryption key from "key_version=1" to "key_version=2," the password sharing system 102 sends "key_version=2" to all client devices that have current membership access to the shared folder. In one or more embodiments, the password sharing system 102 sends the rotated version number to the client devices in response to receiving "list folder" requests from the client devices (e.g., based on notifying the client devices of the key rotation event). By sending the updated version number to the client devices, the password sharing system 102 can initiate a race among client devices to generate a new shared encryption key and commit a new payload for the shared folder.

As depicted by FIG. 4A, as part of the process of generating a new shared encryption key, the first client device 400a and the second client device 400b perform acts 416a-416b of requesting public keys from the password sharing system 102. In one or more embodiments, in response to receiving the rotated version number of the shared encryption key from the password sharing system 102, each client device performs a check of the version number against a version number stored at the corresponding client device. Based on determining that the version number does not match, a client device initiates a process to rotate the shared encryption key by requesting an updated public key set from the password sharing system 102.

As further illustrated in FIG. 4A, the password sharing system 102 performs acts 418a-418b of sending public keys to the first client device 400a and the second client device 400b. For instance, the password sharing system 102 retrieves an updated public key set including public encryption keys for client devices having a current membership access to the shared folder. To illustrate, the password sharing system 102 accesses a sharing membership associated with the shared folder to identify one or more accounts and/or one or more client devices having access to the shared folder. The password sharing system 102 then requests public encryption keys from each of the identified client devices and generates an updated public key set including only the retrieved public encryption keys. By updating the public key set based on a current sharing membership, the password sharing system 102 excludes public encryption keys for client devices that no longer have current membership access to the shared folder. The password sharing system 102 then sends the updated public key set to each of the identified client devices (e.g., the first client device 400a and the second client device 400b).

By providing a rotated key version to client devices—and further sending public keys in response to corresponding requests—the password sharing system 102 causes the client devices to initiate a race to generate a new shared encryption key and commit a new payload for the shared folder. Accordingly, each client device performs a plurality of operations to generate the new shared encryption key and then attempts to commit a new payload for the shared folder. While FIGS. 4A-4B illustrates a single client device (e.g., the second client device 400b) performing the operations associated with generating a new shared encryption key and committing a new payload for the shared folder, each of the client devices having membership access to the shared folder can also perform the operations described below.

As further illustrated in FIG. 4A, for example, the second client device 400b performs an act 420 of encrypting a payload with a modified shared key. In particular, the second client device 400b generates a modified shared encryption key (e.g., by generating a new shared encryption key). The second client device 400b can then utilize the modified shared encryption key to re-encrypt the contents of the shared folder. For example, if a set of passwords in the shared folder is currently encrypted at the second client device 400b, the second client device 400b can decrypt the set of passwords utilizing a private encryption key associated with the second client device 400b. The second client device 400b can then re-encrypt the set of passwords utilizing the modified shared encryption key.

In one or more additional embodiments, the second client device 400b modifies the set of passwords after decrypting the set of passwords. For instance, the second client device 400b can modify a password (e.g., based on modifying the password with a service) stored in the set of passwords, add a new password to the set of passwords, or remove one or more passwords from the set of passwords. The second client device 400b can thus change the set of passwords by modifying existing passwords or adding new passwords (e.g., based on permissions provided to the second client device 400b). The second client device 400b can then encrypt the updated set of passwords utilizing the modified shared encryption key. Accordingly, the updated encrypted payload can include a modified or new set of passwords.

As depicted by in FIG. 4B, the second client device 400b performs an act 422 of encrypting the modified shared key with the public keys. Specifically, the second client device 400b utilizes the updated public key set received from the password sharing system 102 to encrypt the modified shared encryption key. For example, the second client device 400b utilizes each public encryption key associated with each client device having current membership access to the shared folder to generate a plurality of encrypted versions of the modified shared encryption key.

As further illustrated in FIG. 4B, the second client device 400b performs an act 424 of sending an updated encrypted payload and the encrypted modified shared key to the password sharing system 102. For instance, the second client device 400b sends the updated encrypted payload with a plurality of encrypted versions of the modified shared encryption key for storage within the shared folder at the server(s) 104. In one or more embodiments, the second client device 400b also indicates the version number of the shared key in connection with the updated encrypted payload and encrypted modified shared encryption key.

After receiving the updated encrypted payload, the password sharing system 102 performs an act 426 of determining whether any conflicts exist. Specifically, the password sharing system 102 can determine whether the received data from the second client device 400b conflicts with a payload stored in the shared folder. For example, the password sharing system 102 can utilize a version number of the shared encryption key in connection with the received data matches a version number stored in connection with the shared folder. If the version number matches, the password sharing system 102 determines that the data is valid. Alternatively, if the version number does not match, the password sharing system 102 determines that a conflict exists and the data is not valid. As explained further below, based on determining that a version of the shared encryption key conflicts with a modified (or rotated) shared encryption key, the password sharing system 102 rejects the version of the shared encryption key.

As illustrated in FIG. 4B, the password sharing system 102 performs an act 428 of determining the initiator for the shared folder. In one or more embodiments, in response to determining that the data received from the second client device 200b is valid, the password sharing system 102 can establish the second client device 200b is an initiator device. As used herein, the term "initiator device" refers to a computing device that successfully rotates a shared encryption key by generating a new shared encryption key and committing a payload to a shared folder. Accordingly, the password sharing system 102 commits the received data (e.g., the updated encrypted payload and the encrypted modified shared encryption key) to the shared folder. In one or more embodiments, the password sharing system 102 commits a payload only after verifying that a revision number associated with the encrypted payload (e.g., "rev3" is correct).

Furthermore, the password sharing system 102 can determine that other client devices with membership access to the shared folder are follower devices. As used herein, the term "follower device" refers to a computing device that receives a new shared encryption key generated by another client device. For instance, the password sharing system 102 can determine that any other client devices that attempt to commit a payload to the shared folder after the password sharing system 102 has already committed a payload to the shared folder is a follower device. Additionally, in response to determining that a conflict exists between an updated encrypted payload from a client device (e.g., based on a mismatching version number of a shared encryption key), the password sharing system 102 can reject (e.g., abort) the payloads from follower devices and indicate to the follower devices that the payloads were rejected. In some embodiments, the initiator device and follower device(s) can change from one key rotation event to another key rotation event, depending on which client device wins the race to commit for each key rotation event.

As further illustrated in FIG. 4B, the password sharing system 102 performs an act 430 of sending the updated encrypted payload and encrypted modified shared key to the first client device 400a. For example, in response to receiving a request by the first client device 400a to access the shared folder (e.g., via a "list folder" API call), the password sharing system 102 can send the committed payload (e.g., the updated encrypted payload along with the modified shared encryption key received from the second client device 400b) to the first client device 400a. Because the password sharing system 102 committed the data received from the second client device 400b to the shared folder, the data the password sharing system 102 sends to the first client device 400a includes the re-encrypted payload and the encrypted modified shared encryption key to match the rotated version number of the shared encryption key.

After receipt of the updated encrypted payload, the first client device 400a performs an act 432 of decrypting the encrypted modified shared key. Specifically, after receiving the updated encrypted payload and the encrypted modified shared encryption key from the password sharing system 102 for the shared folder, the first client device 400a utilizes a private encryption key to decrypt the modified shared encryption key generated by the second client device 400b. More specifically, the first client device 400a utilizes the private encryption key from the public-private key pair associated with the public encryption key—which the password sharing system 102 previously retrieved from the first client device 400a in the updated public key set—to decrypt the modified shared encryption key.

As finally illustrated by FIG. 4B, the first client device 400a performs an act 434 of decrypting the payload. For instance, after decrypting the modified shared encryption key, the first client device 400a utilizes the modified shared encryption key to decrypt the encrypted payload received from the password sharing system 102. Accordingly, the first client device 400a decrypts the contents of the shared folder encrypted by the second client device 400b. The first client device 400a can then access the contents of the shared folder (e.g., to access one or more passwords stored in the shared folder).

In one or more embodiments, the first client device 400a also verifies that the version number of the shared encryption key stored at the first client device 400a matches the version number of the shared encryption key sent with the payload. For example, the first client device 400a can compare the stored version number with the received version number. In one or more embodiments, if the version numbers do not match, the first client device 400a issues a new request to the password sharing system 102 to synchronize the shared folder to ensure that the first client device 400a has the most up-to-date content for the shared folder.

As described above in relation to FIGS. 4A-4B, the password sharing system 102 provides key rotation of shared encryption keys for encrypting shared folders. In one or more embodiments, a client device rotates a key (e.g., in response to a key rotation initiation notification from the password sharing system 102) by first issuing a "list folder" API call to the password sharing system 102 to obtain changes in metadata for a shared folder. The metadata can include a current key version $K_s$ for the shared encryption key. The client device can determine whether to being operations for rotating the shared encryption key by comparing the key version $K_s$ to the key version $K_c$ stored at the client device. For instance: 1) if the client device determines that $K_s > K_c$, then the client device initiates key rotation; 2) if the client device determines that $K_s = K_c$, then the client device determines that the key versions match, and the client device proceeds as normal; and 3) if the client device determines that $K_s < K_c$, then the client device waits until the next "list folder" call—which can occur if a payload is committed, but a longpoll may not have been triggered to return. Accordingly, the client device determines which operations to perform based on a comparison between the current key version for the shared encryption key and the shared encryption key stored at the client device.

In response to determining to initiate key rotation, the client device can call a "get public keys" API call to obtain the public keys $PK_1, PK_2, \ldots, PK_n$ for the current members of the shared folder. The client device can generate a new shared encryption key (e.g., a new folder key for the shared folder) $K_{folder}$. The client device can then encrypt the folder key with the public key of each member client device: $DK_n = ENC(K_{private}, K_{folder}, PK_n)$. Additionally, the client device uploads the folder key $K_{folder}$ to its own privately encrypted key set and uploads the payload that has $DK_1, DK_2, \ldots, DK_n$ and the encrypted payload (encrypted with $K_{folder}$) to the shared folder. The client device that uploads the folder key becomes the initiator device. If the upload fails due to conflict, signifying that there is already a new version of the payload on the password sharing system 102, the client device returns to issuing a "list folder" call.

In response to determining that a client device is a follower device (i.e., the key versions match), such a determination can indicate one of two things: 1) the existing shared encryption key can decrypt the payload; or 2) the existing key cannot decrypt the payload, and a key rotation just occurred. Based on the second possibility, the client device attempts to find its own device unique identifier (e.g., the identifier indicating the specific instance of the client application) in the payload, decrypt it, and then remove it. Otherwise, the client device issues a new "request sharing keys" call to request new keys from the password sharing system 102.

Figure 5B:
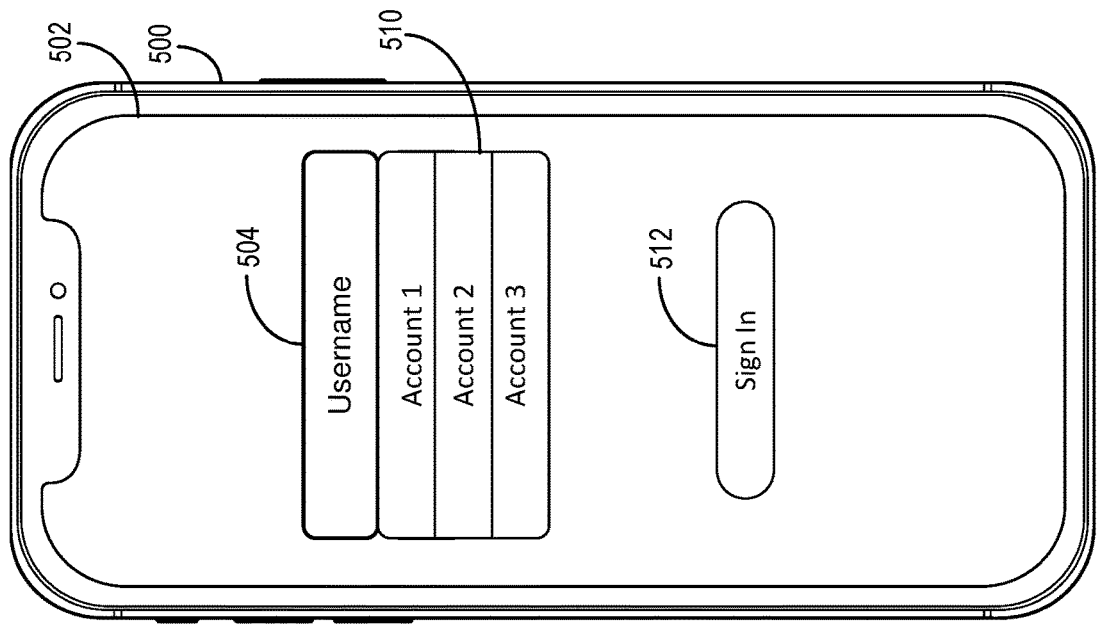
FIGS. 5A-5B illustrate example graphical user interfaces for providing password management and credential auto-fill in accordance with one or more implementations.
Figure 5A:
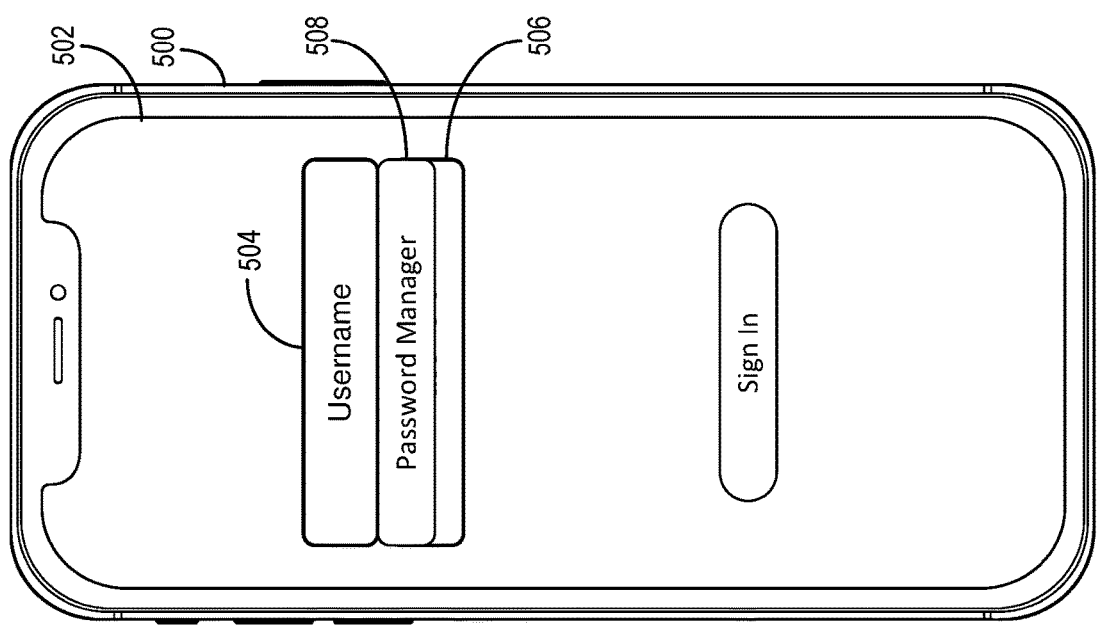

As indicated above, in one or more embodiments, the password sharing system 102 provides shared passwords for a user to access via a variety of client applications. FIGS. 5A-5B illustrate graphical user interfaces for utilizing a client device 500 to access a set of passwords for logging a user in to a service. For example, FIGS. 5A-5B illustrate that the password sharing system 102 provides the client device 500 access to shared passwords for auto-filling requests for credentials to access accounts with one or more services within a client application 502 on the client device 500.

As illustrated in FIG. 5A, the client device 500 includes a user interface of the client application 502. According to one or more embodiments, the client application 502 includes instructions that (upon execution) cause the client device 500 to display content associated with a service for which a user associated with the client device 500 has an account. For example, as illustrated in FIG. 5A, the client device 500 provides a user interface within the client application 502 for logging a user in to the account using login credentials associated with the account. To illustrate, the client application 502 can include an application associated with the service (e.g., a proprietary application) such as a social networking application or a banking application. Alternatively, the client application 502 can include a web browser that displays websites associated with a plurality of different services.

As illustrated in FIG. 5A, the client device 500 displays, within the user interface of the client application 502, interactive elements for providing login credentials to log in to an account. For instance, the user interface can include a username field 504 and a password field 506 for entering a username and a password, respectively, associated with the account. Although FIG. 5A illustrates the client device 500 displaying the username field 504 and the password field 506, a service may require different login credentials or other secure information such as, but not limited to, a personal identification number, a full name of a user, an address, or a security response.

In one or more embodiments, a client device 500 associated with the password sharing system 102 automatically detects that the client device 500 displays elements for entering credentials (e.g., within the client application 502). To illustrate, the client application associated with the password sharing system 102 can run in the background on the client device to detect opportunities for entering credentials. For example, the client application associated with the password sharing system 102 can detect opportunities for entering credentials based on display information or metadata information associated with the user interface of the client application 502.

In response to detecting that the client device 500 displays elements for entering credentials, the password sharing system 102 (e.g., via the associated client application) can provide a prompt associated with the password sharing system 102. For example, as illustrated in FIG. 5A, the client device 500 displays a password manager overlay 508 within the client application 502 for accessing information from the password sharing system 102. To illustrate, the client device 500 can display the password manager overlay 508 near a detected field (e.g., below the username field 504) to allow the user to easily find the prompt.

In one or more embodiments, the password manager overlay 508 is or includes a selectable element to access the password sharing system 102 from within the client application 502. Specifically, in response to a selection of the selectable element, the client device 500 can communicate with the password sharing system 102 to obtain information associated with an account of the user with the password sharing system 102. More specifically, the client device 500 can access a shared folder including a set of passwords accessible to the user. For instance, the client device 500 can request a payload for the shared folder from the password sharing system 102, decrypt a shared encryption key included with the payload (e.g., utilizing a private encryption key stored at the client device 500), and decrypt the payload (e.g., the set of passwords) utilizing the shared encryption key. In one or more alternative embodiments, the client device 500 can maintain a set of passwords within the shared folder on the client device 500 (e.g., by periodically requesting the payload for the shared folder from the password sharing system 102) to more quickly access the passwords in the shared folder.

After decrypting and accessing the contents of the shared folder, as shown in FIG. 5B, the client device 500 displays data associated with the shared passwords. For example, as shown, the client device 500 can display an account overlay 510 including a plurality of accounts for which the shared folder includes passwords. To illustrate, if the account of the user includes membership access to a plurality of passwords associated with a plurality of accounts, the client device 500 displays the corresponding accounts within the account overlay 510. Additionally, if the shared folder includes one or more passwords to which the account of the user is not granted access (e.g., based on a sharing membership or access control levels associated with a corresponding subfolder within the shared folder), the client device 500 does not display the accounts corresponding to those passwords.

In one or more embodiments, in response to a user input to select one of the accounts displayed within the account overlay 510, the client device 500 retrieves the credentials associated with the selected account. For example, if the user selects an element corresponding to "Account 1" via the account overlay 510, the client device 500 associated with the password sharing system 102 retrieves a username and a password associated with "Account 1." The client application associated with the password sharing system 102 then auto-fills (e.g., automatically populates) the username field 504 and the password field 506 with the corresponding username and password, respectively. The client device 500 can also present a login element 512 to log in to a service based on the automatically entered credentials. Accordingly, the password sharing system 102 provides tools (e.g., via the client application associated with the password sharing system 102) to access and utilize password information stored in the shared folder on-the-fly within other client applications on the client device 500.

Figure 6:
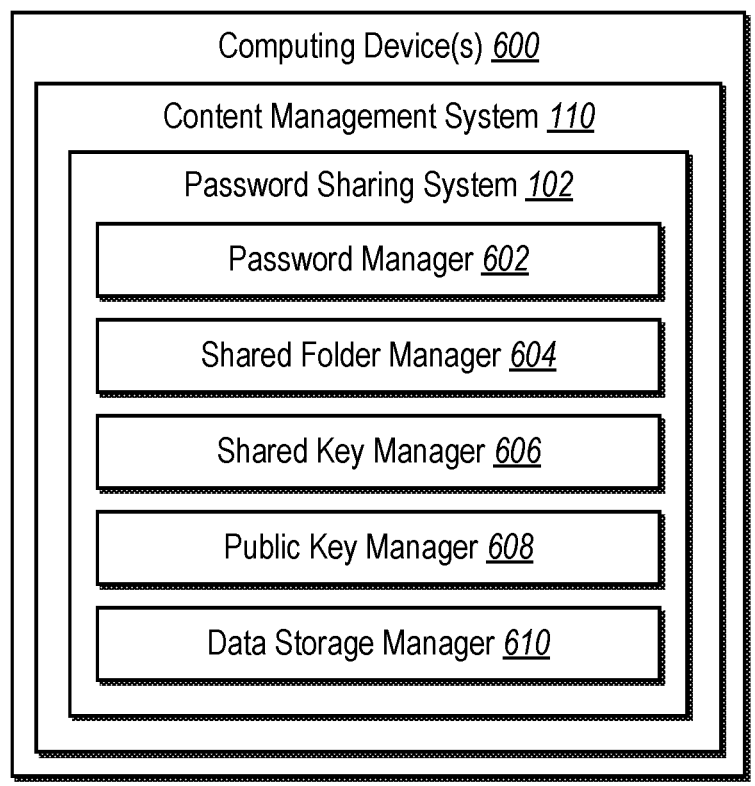
FIG. 6 illustrates a diagram of the password sharing system of FIG. 1 in accordance with one or more implementations.

FIG. 6 illustrates a detailed schematic diagram of an embodiment of the password sharing system 102 described above. As shown, the password sharing system 102 is implemented in the content management system 110 on computing device(s) 600 (e.g., client devices and/or servers as described in FIG. 1, and as further described below in relation to FIG. 8). Additionally, the password sharing system 102 can include, but is not limited to, a password manager 602, a shared folder manager 604, a shared key manager 606, a public key manager 608, and a data storage manager 610. In one or more embodiments, the password sharing system 102 is implemented on any number of computing devices. For example, the password sharing system 102 can be implemented in a distributed system of server devices for managing digital content. The password sharing system 102 can also be implemented within one or more additional systems. Alternatively, the password sharing system 102 can be implemented at least partially on a client device (e.g., a user client device).

In one or more embodiments, each of the components of the password sharing system 102 is in communication with other components using any suitable communication technologies. Additionally, the components of the password sharing system 102 can be in communication with one or more other devices including other computing devices of a user, server devices (e.g., cloud storage devices), licensing servers, or other devices/systems. It will be recognized that although the components of the password sharing system 102 are shown to be separate in FIG. 6, any of the subcomponents may be combined into fewer components, such as into a single component, or divided into more components as may serve a particular implementation. Furthermore, although the components of FIG. 6 are described in connection with the password sharing system 102, at least some of the components for performing operations in conjunction with the password sharing system 102 described herein may be implemented on other devices within the environment.

The components of the password sharing system 102 can include software, hardware, or both. For example, the components of the password sharing system 102 include one or more instructions stored on a computer-readable storage medium and executable by processors of one or more computing devices (e.g., the computing device(s) 600). When executed by the one or more processors, the computer-executable instructions of the password sharing system 102 cause the computing device(s) 600 to perform the operations described herein. Alternatively, the components of the password sharing system 102 include hardware, such as a special purpose processing device to perform a certain function or group of functions. Additionally, or alternatively, the components of the password sharing system 102 include a combination of computer-executable instructions and hardware.

Furthermore, the components of the password sharing system 102 performing the functions described herein with respect to the password sharing system 102 may, for example, be implemented as part of a stand-alone application, as a module of an application, as a plug-in for applications, as a library function or functions that may be called by other applications, and/or as a cloud-computing model. Thus, at least some of the components of the password sharing system 102 may be implemented as part of a stand-alone application on a personal computing device or a mobile device. Alternatively, or additionally, the components of the password sharing system 102 may be implemented in any application that provides digital content management or password management.

As mentioned, the password sharing system 102 includes a password manager 602. In one or more embodiments, the password manager 602 manages one or more passwords associated with one or more accounts of users. For example, the password manager 602 can manage login credentials or secure information for logging one or more users in to one or more services associated with the one or more accounts of the users. In addition, the password manager 602 can manage subsets of passwords, such as by enforcing password permissions for users.

The password sharing system 102 can also include a shared folder manager 604. For example, the shared folder manager 604 can manage a folder structure or hierarchy of a shared folder (e.g., a root folder and one or more sub-folders). Additionally, the shared folder manager 604 can also manage contents of a shared folder and any sub-folders. For example, the shared folder manager 604 can manage the location of data (e.g., encrypted or unencrypted) in a shared folder on one or more devices with access to the shared folder.

In one or more embodiments, the shared folder manager 604 also manages a sharing membership associated with a shared folder. For example, the shared folder manager 604 can manage which user accounts and/or client devices have access to a shared folder based on a sharing membership for the shared folder. The shared folder manager 604 can also manage access permissions (including access control levels) to a shared folder and any sub-folders within the shared folder.

The shared folder manager 604 can also manage API calls and operations by servers and/or client devices in connection with a shared folder. To illustrate, the shared folder manager 604 can manage requests to access content in the shared folder. The shared folder manager 604 can also manage requests to store/commit payloads from one or more client devices to the shared folder.

The password sharing system 102 can also include a shared key manager 606. The shared key manager 606 can manage shared encryption keys associated with a shared folder (e.g., shared encryption keys utilized to encrypt a payload of the shared folder). For example, the shared key manager 606 can manage a version number of a shared encryption key associated with a shared folder. The shared key manager 606 can also manage key rotation events associated with a shared folder, including detecting the key rotation events and notifying client devices of the key rotation events.

Additionally, the password sharing system 102 can include a public key manager 608. The public key manager 608 can manage a public key set associated with a shared folder. For instance, the public key manager 608 can retrieve and/or update public encryption keys from one or more client devices having membership access to a shared folder. The public key manager 608 can also provide public key sets to client devices in connection with providing access to the shared folder to the client devices.

The password sharing system 102 further includes a data storage manager 610 (that comprises a non-transitory computer memory/one or more memory devices) that stores and maintains data associated with a shared folder. For example, the data storage manager 610 can store passwords, encryption keys, sharing memberships, and metadata associated with a shared folder. The data storage manager 610 can also store account information associated with one or more users of the content management system 110 and/or the password sharing system 102.

Figure 7:
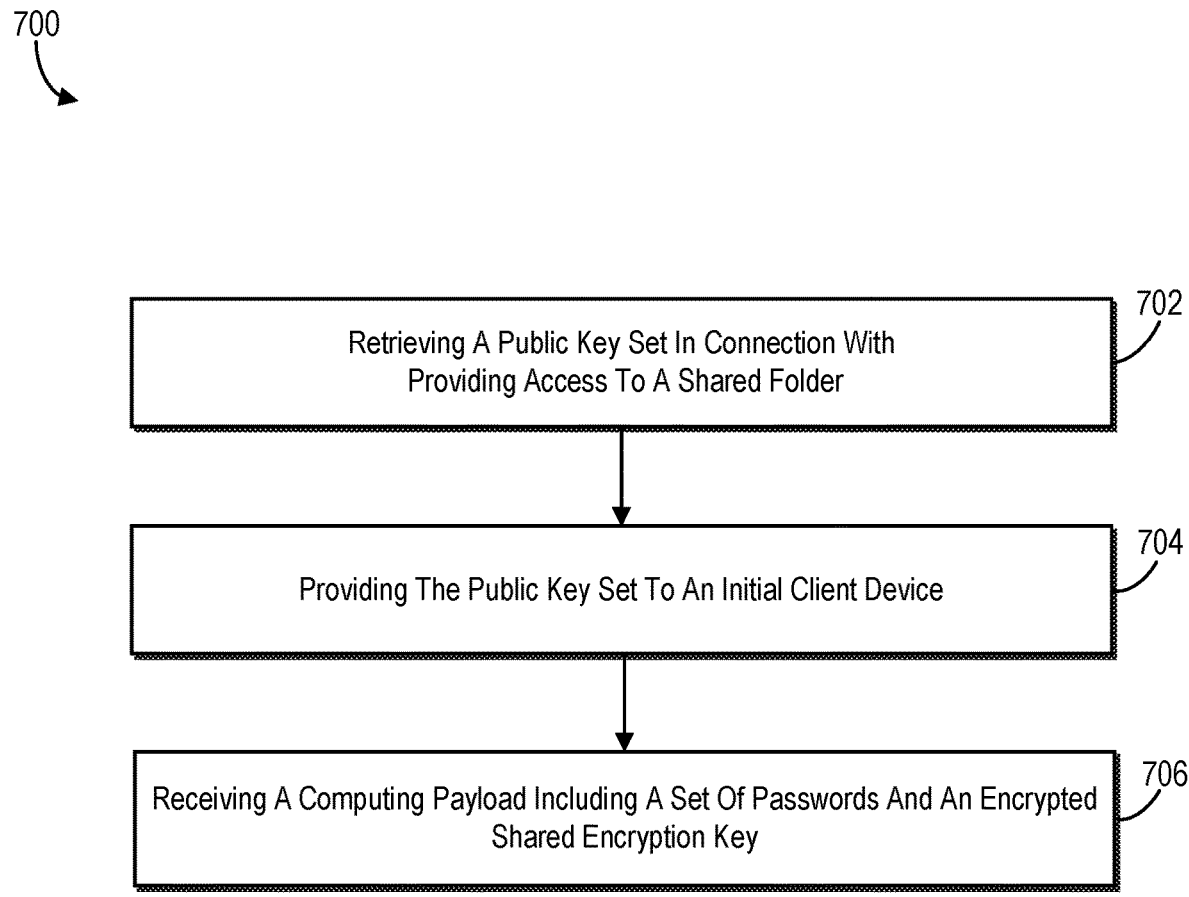
FIG. 7 illustrates a flowchart of a series of acts for utilizing encryption key exchange and key rotation to share passwords via a shared folder in accordance with one or more embodiments.

Turning now to FIG. 7, this figure illustrates a flowchart of a series of acts 700 of utilizing encryption key exchange and key rotation to share passwords via a shared folder in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable medium can comprise instructions, that when executed by one or more processors, cause a computing device to perform the acts of FIG. 7. In still further embodiments, a system can perform the acts of FIG. 7.

FIG. 7 illustrates that the series of acts 700 includes an act 702 of retrieving a public key set in connection with providing access to a shared folder. For example, act 702 involves retrieving a public key set comprising one or more public encryption keys associated with one or more additional client devices in connection with providing access to a shared folder. For instance, act 702 can involve requesting a first public encryption key from a first client device associated with a first additional account of the content management system. Act 702 can also involve requesting a second public encryption key from a second client device associated with a second additional account of the content management system.

Act 702 can involve determining an additional account of the content management system according to a sharing membership for the shared folder. Act 702 can then involve requesting a public encryption key for a registered client device associated with the additional account of the content management system. Thus, act 702 can involve requesting a public encryption key for a registered client device associated with the sharing membership for the shared folder. Act 702 can then involve providing, as part of the public key set, the public encryption key from the registered client device to the initial client device to cause the initial client device to encrypt the shared encryption key utilizing the public key set including the public encryption key from the registered client device.

Additionally, act 702 can include determining a set of password permissions associated with a set of passwords. Act 702 can also involve generating a folder structure for the shared folder with access permissions to one or more folders corresponding to the set of password permissions within the folder structure. For example, act 702 can involve determining a hierarchy of folders within the shared folder. Act 702 can then involve determining access permissions for each folder in the hierarchy of folders according to password permissions for a sharing membership for the shared folder.

As part of act 702, or as an additional act, the series of acts 700 can include assigning, to a first account of the content management system, a first set of access permissions for a first set of folders corresponding to a first set of passwords within the hierarchy of folders. The series of acts 700 can then involve assigning, to a second account of the content management system, a second set of access permissions for a second set of folders corresponding to a second set of passwords within the hierarchy of folders.

As part of act 702, or as an additional act, the series of acts 700 can include receiving a request from the initial client device to generate the shared folder for the set of passwords to provide access to the one or more additional client devices. Additionally, the series of acts 702 can include receiving a request from the initial client device to share the shared folder for the set of passwords to provide access to the one or more additional client devices after the shared folder has previously been generated.

Additionally, the series of acts 700 includes an act 704 of providing the public key set to the initial client device. For example, act 704 involves providing the public key set to an initial client device associated with an account of the content management system. Act 704 can involve providing the public key set including the one or more public encryption keys associated with the one or more additional client devices to the initial client device. To illustrate, act 704 can involve providing, as part of the public key set, the first public encryption key and the second public encryption key to the initial client device.

Furthermore, the series of acts 700 includes an act 706 of receiving a computing payload including the set of passwords and an encrypted shared encryption key. For example, act 706 involves receiving, from the initial client device for storage within the shared folder, an encrypted payload comprising the set of passwords and a shared encryption key that is utilized to encrypt the set of passwords and is encrypted in the shared folder utilizing the public key set.

Act 706 can involve receiving, as part of the encrypted payload, the shared encryption key encrypted utilizing the one or more public encryption keys associated with the one or more additional client devices.

The series of acts 700 can also include determining that a new client device associated with the account of the content management system is added to a sharing membership for the shared folder. The series of acts 700 can then include providing, to the initial client device, a new public encryption key associated with the new client device. The series of acts 700 can also include receiving, from the initial client device, the shared encryption key encrypted in the shared folder utilizing the new public encryption key. Additionally, the series of acts 700 can include providing, to the new client device, the encrypted payload comprising the set of passwords and the shared encryption key encrypted in the shared folder utilizing the new public encryption key.

The series of acts 700 can include detecting a key rotation event for changing the shared encryption key. The series of acts 700 can include in response to the key rotation event, sending an indication of the key rotation event to a plurality of client devices having current membership access to the shared folder. Additionally, the series of acts 700 can include retrieving an updated public key set from a plurality of client devices and providing the updated public key set to the plurality of client devices. The series of acts 700 can also include receiving, from an initiator device of the plurality of client devices for storage within the shared folder, an updated encrypted payload comprising the set of passwords and a modified shared encryption key that is utilized to re-encrypt the set of passwords and is encrypted in the shared folder utilizing the updated public key set.

Furthermore, the series of acts 700 can include detecting the key rotation event by detecting a change in a sharing membership for the shared folder. The series of acts 700 can include detecting the key rotation event by receiving a command from a client device of the plurality of client devices to change the shared encryption key. The series of acts 700 can alternatively include detecting the key rotation by detecting a time threshold associated with the shared folder.

For example, the series of acts 700 can include detecting a change in a sharing membership for the shared folder. The series of acts 700 can then include in response to the detected change in the sharing membership, determining an updated sharing membership for the shared folder including a plurality of accounts of the content management system corresponding to a plurality of client devices. Further in response to the detected change in the sharing membership, the series of acts 700 can include sending an indication of a key rotation event to the plurality of client devices associated with the updated sharing membership.

The series of acts 700 can include receiving the updated encrypted payload for upload to the shared folder from a first client device of the plurality of client devices before or without receiving the updated encrypted payload a second client device of the plurality of client devices. The series of acts 700 can include in response to receiving the updated encrypted payload from the first client device before or without receiving the updated encrypted payload from the second client device, determining that the first client device is the initiator device and the second client device is a follower device. Additionally, the series of acts 700 can include sending the updated encrypted payload comprising the set of passwords and the modified shared encryption key to the second client device.

In connection with detecting a key rotation event, the series of acts 700 can include receiving, prior to sending the updated encrypted payload to the second client device, an additional modified shared encryption key from the second client device. For example, the series of acts 700 can include receiving the additional modified shared encryption key from a follower device of the plurality of client devices after receiving the updated encrypted payload from the initiator device. Additionally, the series of acts 700 can include detecting a conflict between the modified shared encryption key received from the first client device (e.g., the initiator device) and the additional modified shared encryption key received from the second client device (e.g., the follower device). The series of acts 700 can also include rejecting the additional modified shared encryption key received from the second client device in response to detecting the conflict. The series of acts 700 can then include sending the updated encrypted payload comprising the set of passwords and the modified shared encryption key received from the initiator device to the follower device.

In one or more embodiments, the series of acts 700 includes receiving the shared encryption key encrypted by the one or more public encryption keys associated with the one or more additional client devices. The series of acts 700 can then include providing the shared encryption key encrypted by the one or more public encryption keys to the one or more additional client devices with the set of passwords encrypted utilizing the shared encryption key.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
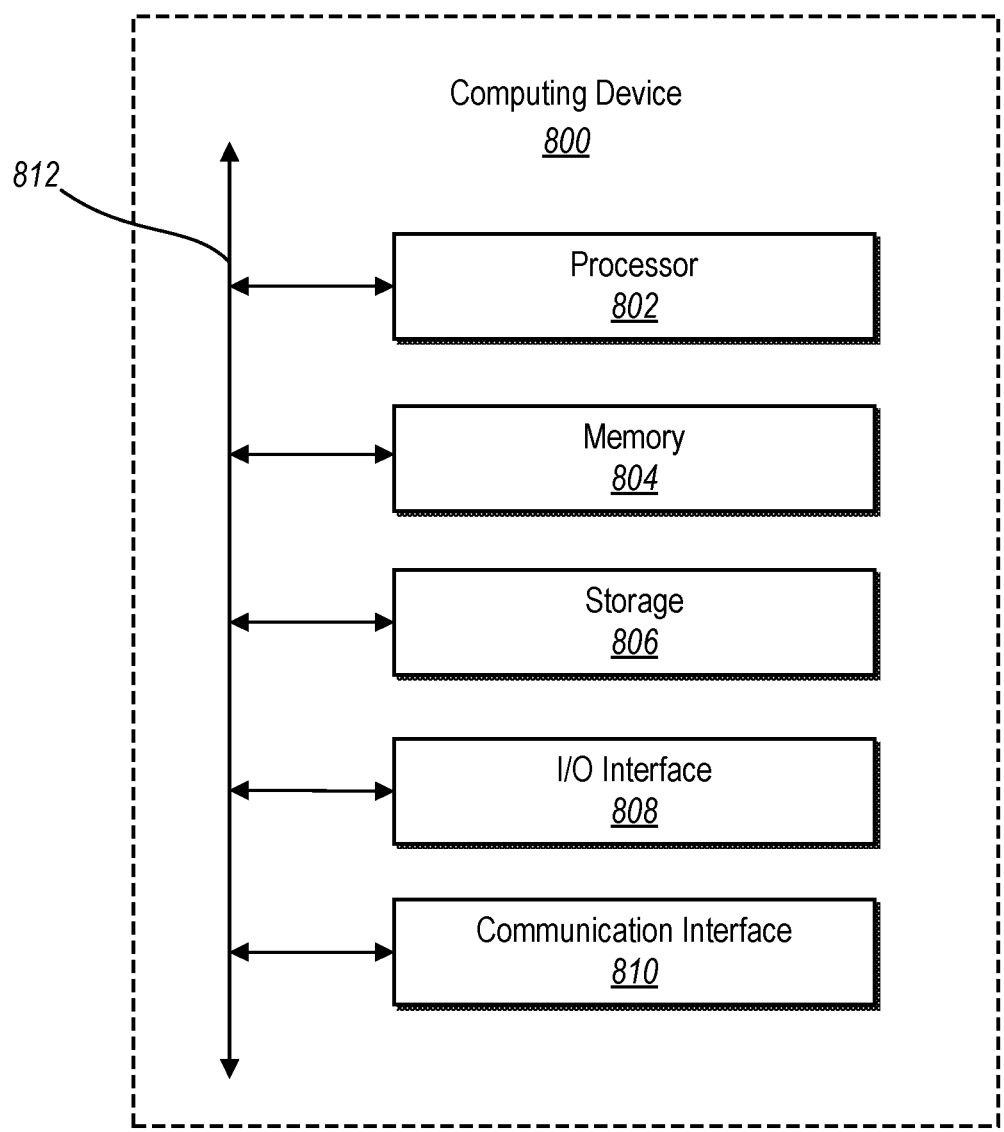
FIG. 8 illustrates a block diagram of a computing device in accordance with one or more embodiments.

FIG. 8 illustrates a block diagram of exemplary computing device 800 that may be configured to perform one or more of the processes described above. One will appreciate that client devices described herein and/or the content management system 110 may comprise one or more computing devices such as computing device 800. As shown by FIG. 8, computing device 800 can comprise processor 802, memory 804, storage device 806, I/O interface 808, and communication interface 810, which may be communicatively coupled by way of communication infrastructure 812. While an exemplary computing device 800 is shown in FIG. 8, the components illustrated in FIG. 8 are not intended to be limiting. Additional or alternative components may be used in other embodiments. Furthermore, in certain embodiments, computing device 800 can include fewer components than those shown in FIG. 8. Components of computing device 800 shown in FIG. 8 will now be described in additional detail.

In particular embodiments, processor 802 includes hardware for executing instructions, such as those making up a computer program. As an example, and not by way of limitation, to execute instructions, processor 802 may retrieve (or fetch) the instructions from an internal register, an internal cache, memory 804, or storage device 806 and decode and execute them. In particular embodiments, processor 802 may include one or more internal caches for data, instructions, or addresses. As an example and not by way of limitation, processor 802 may include one or more instruction caches, one or more data caches, and one or more translation lookaside buffers (TLBs). Instructions in the instruction caches may be copies of instructions in memory 804 or storage 806.

Memory 804 may be used for storing data, metadata, and programs for execution by the processor(s). Memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 804 may be internal or distributed memory.

Storage device 806 includes storage for storing data or instructions. As an example and not by way of limitation, storage device 806 can comprise a non-transitory storage medium described above. Storage device 806 may include a hard disk drive (HDD), a floppy disk drive, flash memory, an optical disc, a magneto-optical disc, magnetic tape, or a Universal Serial Bus (USB) drive or a combination of two or more of these. Storage device 806 may include removable or non-removable (or fixed) media, where appropriate. Storage device 806 may be internal or external to computing device 800. In particular embodiments, storage device 806 is non-volatile, solid-state memory. In other embodiments, Storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 808 allows a user to provide input to, receive output from, and otherwise transfer data to and receive data from computing device 800. I/O interface 808 may include a mouse, a keypad or a keyboard, a touch screen, a camera, an optical scanner, network interface, modem, other known I/O devices or a combination of such I/O interfaces. I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 808 is configured to provide graphical data to a display for presentation to a user. The graphical data may be representative of one or more graphical user interfaces and/or any other graphical content as may serve a particular implementation.

Communication interface 810 can include hardware, software, or both. In any event, communication interface 810 can provide one or more interfaces for communication (such as, for example, packet-based communication) between computing device 800 and one or more other computing devices or networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 812 may include hardware, software, or both that couples components of computing device 800 to each other. As an example and not by way of limitation, communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 9:
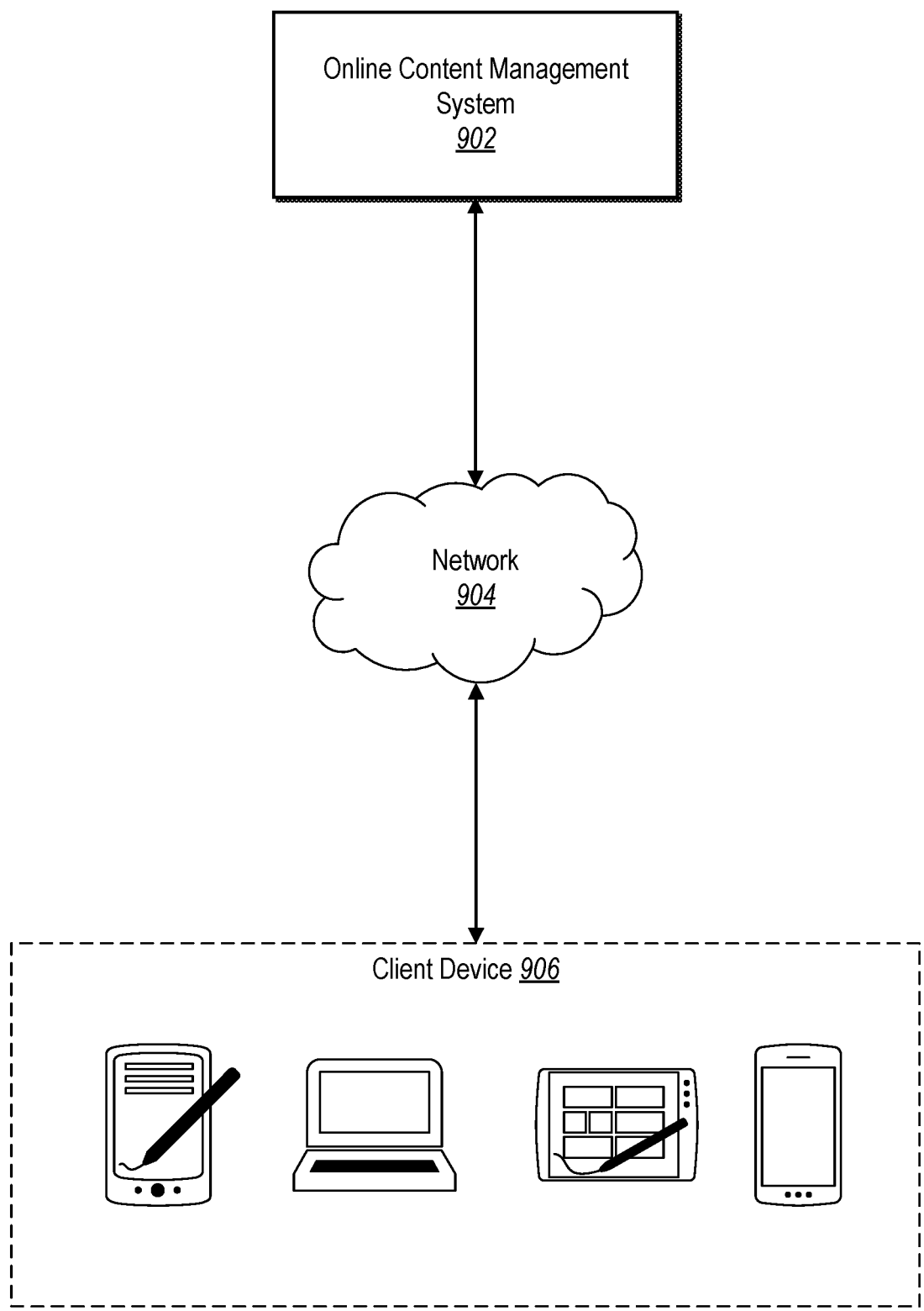
FIG. 9 illustrates a networking environment of an online content management system in accordance with one or more embodiments.

FIG. 9 is a schematic diagram illustrating an environment within which one or more embodiments of system 102 can be implemented. Online content management system 902 may generate, store, manage, receive, and send digital content (such as digital videos). For example, online content management system 902 may send and receive digital content to and from client devices 906 by way of network 904. In particular, online content management system 902 can store and manage a collection of digital content. Online content management system 902 can manage the sharing of digital content between computing devices associated with a plurality of users. For instance, online content management system 902 can facilitate a user sharing a digital content with another user of online content management system 902.

In particular, online content management system 902 can manage synchronizing digital content across multiple client devices 906 associated with one or more users. For example, a user may edit digital content using client device 906. The online content management system 902 can cause client device 906 to send the edited digital content to online content management system 902. Online content management system 902 then synchronizes the edited digital content on one or more additional computing devices.

In addition to synchronizing digital content across multiple devices, one or more embodiments of online content management system 902 can provide an efficient storage option for users that have large collections of digital content. For example, online content management system 902 can store a collection of digital content on online content management system 902, while the client device 906 only stores reduced-sized versions of the digital content. A user can navigate and browse the reduced-sized versions (e.g., a thumbnail of a digital image) of the digital content on client device 906. In particular, one way in which a user can experience digital content is to browse the reduced-sized versions of the digital content on client device 906.

Another way in which a user can experience digital content is to select a reduced-size version of digital content to request the full- or high-resolution version of digital content from online content management system 902. In particular, upon a user selecting a reduced-sized version of digital content, client device 906 sends a request to online content management system 902 requesting the digital content associated with the reduced-sized version of the digital content. Online content management system 902 can respond to the request by sending the digital content to client device 906. Client device 906, upon receiving the digital content, can then present the digital content to the user. In this way, a user can have access to large collections of digital content while minimizing the amount of resources used on client device 906.

Client device 906 may be a desktop computer, a laptop computer, a tablet computer, a personal digital assistant (PDA), an in- or out-of-car navigation system, a handheld device, a smartphone or other cellular or mobile phone, or a mobile gaming device, other mobile device, or other suitable computing devices. Client device 906 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 904.

Network 904 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 906 may access online content management system 902.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a content management system to:

provide, to an initial client device of a plurality of client devices associated with a shared folder of the content management system, a public key set comprising one or more public encryption keys associated with one or more additional client devices of the plurality of client devices;

receive, from the initial client device for storage within the shared folder, an encrypted payload comprising a set of passwords and a shared encryption key that is utilized to encrypt the set of passwords and is encrypted in the shared folder utilizing the public key set;

detect a key rotation event for replacing the shared encryption key with a modified shared encryption key;

provide an updated public key set to one or more client devices of the plurality of client devices in response to the key rotation event; and receive, from an initiator device of the one or more client devices and for storage within the shared folder, an updated encrypted payload comprising the set of passwords and the modified shared encryption key that is utilized to re-encrypt the set of passwords and is encrypted in the shared folder utilizing the updated public key set.

2. The non-transitory computer readable storage medium as recited in claim 1, further comprising instructions that, when executed by the at least one processor, cause the content management system to retrieve the public key set by:
   determining an account of the content management system according to a sharing membership for the shared folder; and
   requesting a public encryption key for a registered client device associated with the account of the content management system.

3. The non-transitory computer readable storage medium as recited in claim 1, further comprising instructions that, when executed by the at least one processor, cause the content management system to receive a request to generate the shared folder for the set of passwords by:
   determining a set of password permissions associated with the set of passwords; and
   generating a folder structure for the shared folder with access permissions to one or more folders corresponding to the set of password permissions within the folder structure.

4. The non-transitory computer readable storage medium as recited in claim 1, further comprising instructions that, when executed by the at least one processor, cause the content management system to receive the encrypted payload by receiving, as part of the encrypted payload, the shared encryption key encrypted utilizing the one or more public encryption keys associated with the one or more additional client devices.

5. The non-transitory computer readable storage medium as recited in claim 1, further comprising instructions that, when executed by the at least one processor, cause the content management system to:
   determine that a new client device associated with an account of the content management system is added to a sharing membership for the shared folder;
   provide, to the initial client device, a new public encryption key associated with the new client device;
   receive, from the initial client device, the shared encryption key encrypted in the shared folder utilizing the new public encryption key; and
   provide, to the new client device, the encrypted payload comprising the set of passwords and the shared encryption key encrypted in the shared folder utilizing the new public encryption key.

6. The non-transitory computer readable storage medium as recited in claim 1, further comprising instructions that, when executed by the at least one processor, cause the content management system to provide the updated public key set to the one or more client devices of the plurality of client devices by:
   in response to the key rotation event, sending an indication of the key rotation event to a one or more client devices having current membership access to the shared folder;
   retrieving the updated public key set from the one or more client devices having current membership access to the shared folder; and
   providing the updated public key set to the one or more client devices having current membership access to the shared folder.

7. The non-transitory computer readable storage medium as recited in claim 6, further comprising instructions that, when executed by the at least one processor, cause the content management system to detect the key rotation event by:
   detecting a change in a sharing membership for the shared folder;
   receiving a command from a client device of the plurality of client devices to change the shared encryption key; or
   detecting a time threshold associated with the shared folder.

8. The non-transitory computer readable storage medium as recited in claim 6, further comprising instructions that, when executed by the at least one processor, cause the content management system to:
   receive the updated encrypted payload for upload to the shared folder from a first client device of the plurality of client devices before or without receiving the updated encrypted payload a second client device of the plurality of client devices;
   in response to receiving the updated encrypted payload from the first client device before or without receiving the updated encrypted payload from the second client device, determine that the first client device is the initiator device and the second client device is a follower device; and
   send the updated encrypted payload comprising the set of passwords and the modified shared encryption key to the second client device.

9. The non-transitory computer readable storage medium as recited in claim 8, further comprising instructions that, when executed by the at least one processor, cause the content management system to:
   receive, prior to sending the updated encrypted payload to the second client device, an additional modified shared encryption key from the second client device;
   detect a conflict between the modified shared encryption key received from the first client device and the additional modified shared encryption key received from the second client device; and
   reject the additional modified shared encryption key received from the second client device in response to detecting the conflict.

10. A system comprising:
    at least one processor; and
    a non-transitory computer readable storage medium comprising instructions that, when executed by the at least one processor, cause the system to:
        provide, to an initial client device of a plurality of client devices associated with a shared folder of a content management system, a public key set comprising one or more public encryption keys associated with one or more additional client devices of the plurality of client devices; and receive, from the initial client device for storage within the shared folder, an encrypted payload comprising a set of passwords and a shared encryption key that is utilized to encrypt the set of passwords and is encrypted in the shared folder utilizing the public key set;

detect a key rotation event for replacing the shared encryption key with a modified shared encryption key;

provide an updated public key set to one or more client devices of the plurality of client devices in response to the key rotation event; and receive, from an initiator device of the one or more client devices and for storage within the shared folder, an updated encrypted payload comprising the set of passwords and the modified shared encryption key that is utilized to re-encrypt the set of passwords and is encrypted in the shared folder utilizing the updated public key set.

11. The system as recited in claim 10, further comprising instructions that, when executed by the at least one processor, cause the system to:

retrieve the public key set by requesting a public encryption key for a registered client device associated with a sharing membership for the shared folder; and provide the public key set to the initial client device by providing, as part of the public key set, the public encryption key from the registered client device to the initial client device to cause the initial client device to encrypt the shared encryption key utilizing the public key set including the public encryption key from the registered client device.

12. The system as recited in claim 10, further comprising instructions that, when executed by the at least one processor, cause the system to receive a request to generate the shared folder for the set of passwords by:

determining a hierarchy of folders within the shared folder; and determining access permissions for each folder in the hierarchy of folders according to password permissions for a sharing membership for the shared folder.

13. The system as recited in claim 12, further comprising instructions that, when executed by the at least one processor, cause the system to:

assign, to a first account of the content management system, a first set of access permissions for a first set of folders corresponding to a first set of passwords within the hierarchy of folders; and assign, to a second account of the content management system, a second set of access permissions for a second set of folders corresponding to a second set of passwords within the hierarchy of folders.

14. The system as recited in claim 10, further comprising instructions that, when executed by the at least one processor, cause the system to:

detect a change in a sharing membership for the shared folder;

in response to the detected change in the sharing membership:

determine an updated sharing membership for the shared folder including a plurality of accounts of the content management system corresponding to the one or more client devices of the plurality of client devices; and send an indication of a key rotation event to the one or more client devices of the plurality of client devices;

retrieve a plurality of public encryption keys from the one or more client devices of the plurality of client devices; and provide the updated public key set comprising the plurality of public encryption keys to the one or more client devices of the plurality of client devices.

15. The system as recited in claim 14, further comprising instructions that, when executed by the at least one processor, cause the system to:

receive an additional modified shared encryption key from a follower device of the one or more client devices of the plurality of client devices after receiving the updated encrypted payload from the initiator device;

in response to detecting a conflict between the modified shared encryption key received from the initiator device and the additional modified shared encryption key from the follower device, reject the additional modified shared encryption key received from the follower device; and send the updated encrypted payload comprising the set of passwords and the modified shared encryption key received from the initiator device to the follower device.

16. The system as recited in claim 10, further comprising instructions that, when executed by the at least one processor, cause the system to:

receive the shared encryption key encrypted by the one or more public encryption keys associated with the one or more additional client devices; and provide the shared encryption key encrypted by the one or more public encryption keys to the one or more additional client devices with the set of passwords encrypted utilizing the shared encryption key.

17. A method comprising:

providing, to an initial client device of a plurality of client devices associated with a shared folder of a content management system, a public key set comprising one or more public encryption keys associated with one or more additional client devices of the plurality of client devices;

receiving, from the initial client device for storage within the shared folder, an encrypted payload comprising a set of passwords and a shared encryption key that is utilized to encrypt the set of passwords and is encrypted in the shared folder utilizing the public key set;

detecting a key rotation event for replacing the shared encryption key with a modified shared encryption key;

providing an updated public key set to one or more client devices of the plurality of client devices in response to the key rotation event; and receiving, from an initiator device of the one or more client devices and for storage within the shared folder, an updated encrypted payload comprising the set of passwords and the modified shared encryption key that is utilized to re-encrypt the set of passwords and is encrypted in the shared folder utilizing the updated public key set.

18. The method as recited in claim 17, wherein:

retrieving the public key set comprises:

requesting a first public encryption key from a first client device associated with a first account of the content management system; and requesting a second public encryption key from a second client device associated with a second account of the content management system; and wherein providing the public key set to the initial client device comprises providing, as part of the public key set, the first public encryption key and the second public encryption key to the initial client device.

19. The method as recited in claim 17, further comprising:

in response to the key rotation event:

determining an updated sharing membership for the shared folder; and sending an indication of the key rotation event to the one or more client devices of the plurality of client devices based on the updated sharing membership;

retrieving the updated public key set from the one or more client devices of the plurality of client devices; and providing the updated public key set to the one or more client devices of the plurality of client devices according to the updated sharing membership.

20. The method as recited in claim 19, wherein detecting the key rotation event for changing the shared encryption key comprises:

detecting a change in a sharing membership for the shared folder;

receiving a command from a client device of the plurality of client devices to change the shared encryption key; or detecting a time threshold associated with the shared folder.

\* \* \* \* \*